US012720194B2

(12) United States Patent
Baek et al.

(10) Patent No.: US 12,720,194 B2
(45) Date of Patent: Aug. 25, 2026

(54) ELECTRONIC DEVICE INCLUDING NEURAL NETWORK COMPUTING DEVICE AND IMAGE SENSOR DEVICE

(71) Applicant: SAMSUNG ELECTRONICS CO., LTD., Suwon-si (KR)

(72) Inventors: Ingyu Baek, Suwon-si (KR); Soonhyung Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 78 days.

(21) Appl. No.: 18/977,524

(22) Filed: Dec. 11, 2024

(65) Prior Publication Data

US 2025/0330703 A1 Oct. 23, 2025

(30) Foreign Application Priority Data

Apr. 19, 2024 (KR) ........................ 10-2024-0052817

(51) Int. Cl.

| | |
|---|---|
| ***H04N 23/667*** | (2023.01) |
| ***G06V 10/82*** | (2022.01) |
| ***H04N 23/66*** | (2023.01) |
| ***H04N 25/771*** | (2023.01) |
| ***H04N 25/772*** | (2023.01) |
| ***H04N 25/78*** | (2023.01) |

(52) U.S. Cl.
CPC ........... *H04N 23/667* (2023.01); *G06V 10/82* (2022.01); *H04N 23/66* (2023.01); *H04N 25/771* (2023.01); *H04N 25/772* (2023.01); *H04N 25/78* (2023.01)

(58) Field of Classification Search
CPC .... H04N 23/667; H04N 23/66; H04N 25/771; H04N 25/772; H04N 25/78; H04N 25/7795; G06V 10/82; G01S 7/417
See application file for complete search history.

(56) References Cited

U.S. PATENT DOCUMENTS

| | | | | |
|---|---|---|---|---|
| 11,568,609 | B1 | 1/2023 | Liu et al. | |
| 11,588,994 | B2 | 2/2023 | Wang et al. | |
| 11,948,089 | B2 * | 4/2024 | Berkovich | G06N 3/04 |
| 2021/0019606 | A1 * | 1/2021 | Yang | G06T 1/20 |
| 2021/0127090 | A1 | 4/2021 | Kale et al. | |
| 2021/0142086 | A1 | 5/2021 | Berkovich et al. | |
| 2021/0142146 | A1 | 5/2021 | Kale et al. | |
| 2021/0264679 | A1 * | 8/2021 | Liu | G06V 40/19 |
| 2022/0032932 | A1 | 2/2022 | Kale et al. | |
| 2022/0036164 | A1 | 2/2022 | Kale et al. | |

(Continued)

OTHER PUBLICATIONS

Mohammad Faissal Amir et al., "3-D Stacked Image Sensor with Deep Neural Network Computation"—IEEE Sensors Journal, vol. 18, No. 10, pp. 4187-4199—May 15, 2018 (Year: 2018).*

*Primary Examiner* — Marly S Camargo
(74) *Attorney, Agent, or Firm* — Sughrue Mion, PLLC

(57) ABSTRACT

An electronic device, including: a neural network computing device configured to perform a computing operation corresponding to a neural network model; and an image sensor device including: a pixel array configured to receive optical signals and convert the received optical signals into electrical signals; and a memory, wherein based on a mode of the image sensor device being a first mode, the memory is configured to store a pixel value, and wherein based on the mode of the image sensor device being a second mode, the memory is further configured to store neural network model-related data.

20 Claims, 17 Drawing Sheets

1000

1100

NEURAL NETWORK COMPUTING DEVICE

NNM

1200

IMAGE SENSOR DEVICE

MEMORY MEM

(56) References Cited

U.S. PATENT DOCUMENTS

| | | | | |
|---|---|---|---|---|
| 2022/0044101 | A1 | 2/2022 | Kale | |
| 2023/0198905 | A1 | 6/2023 | Bielby | |
| 2026/0104509 | A1 * | 4/2026 | Nagai | G01S 17/14 |

* cited by examiner

Figure 13:
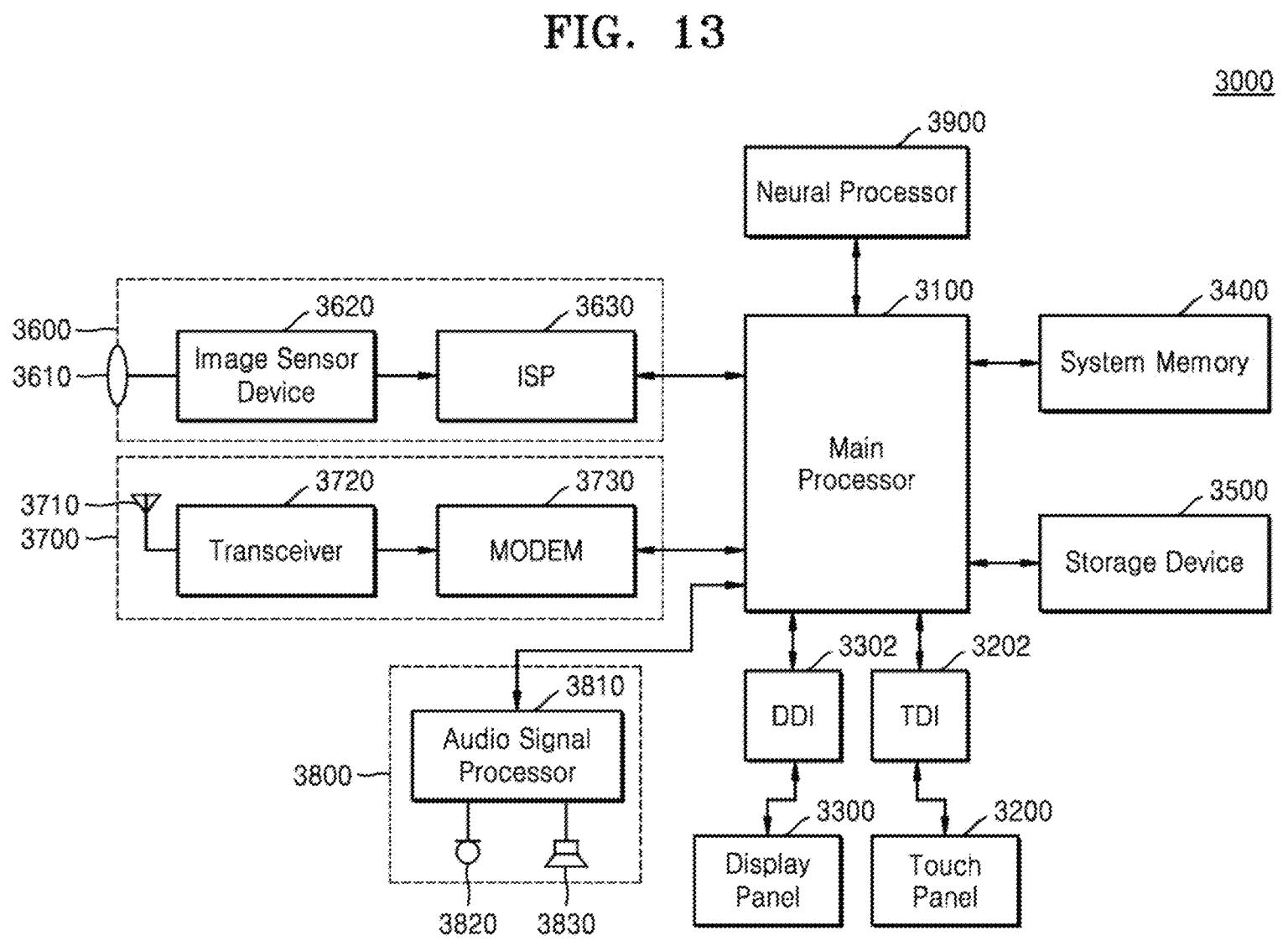

Neural Processor 3900
Main Processor 3100
System Memory 3400
Storage Device 3500
TDI 3202
Touch Panel 3200
DDI 3302
Display Panel 3300
Image Sensor Device 3620
ISP 3630
3600
3610
Transceiver 3720
MODEM 3730
3710
3700
Audio Signal Processor 3810
3820
3830
3800

ELECTRONIC DEVICE INCLUDING NEURAL NETWORK COMPUTING DEVICE AND IMAGE SENSOR DEVICE

CROSS-REFERENCE TO RELATED APPLICATION

This application is based on and claims priority under 35 U.S.C. § 119 to Korean Patent Application No. 10-2024-0052817, filed on Apr. 19, 2024, in the Korean Intellectual Property Office, the disclosure of which is incorporated by reference herein in its entirety.

BACKGROUND

1. Field

The disclosure relates to an electronic device, and more particularly, to an electronic device including a neural network computing device and an image sensor device.

2. Description of Related Art

A neural network may refer to a network in which a node and a synapse are repeatedly connected. In a process in which data moves from a current node to a subsequent node, various kinds of signal processing may occur according to corresponding synapses, and these signal processing processes may be referred to as layers. For example, a neural network may include various layers connected to each other in a relatively complicated manner.

Because various layers included in a neural network may perform a significant number of computations, various approaches for neural network optimization have been developed. For example, to facilitate processing a large amount of data, some approaches involve increasing at least one of a memory size, a data transmission width, and an operating frequency. However, these approaches may be difficult to implement.

SUMMARY

Provided is an electronic device including a neural network computing device and an image sensor device, which may have improved performance.

Additional aspects will be set forth in part in the description which follows and, in part, will be apparent from the description, or may be learned by practice of the presented embodiments.

In accordance with an aspect of the disclosure, an electronic device includes: a neural network computing device configured to perform a computing operation corresponding to a neural network model; and an image sensor device including: a pixel array configured to receive optical signals and convert the received optical signals into electrical signals; and a memory, wherein based on a mode of the image sensor device being a first mode, the memory is configured to store a pixel value, and wherein based on the mode of the image sensor device being a second mode, the memory is further configured to store neural network model-related data.

In accordance with an aspect of the disclosure, an electronic device includes: a neural network computing device configured to perform a computing operation corresponding to a neural network model; and an image sensor device, wherein the image sensor device includes: a pixel array including a plurality of digital pixels; and a buffer memory configured to temporarily store at least one from among a digital signal and image data corresponding to a signal output from the pixel array, wherein each digital pixel from among the plurality of digital pixels includes: a photodetector, an analog-to-digital converter, and a memory circuit, wherein a memory of the image sensor device includes the buffer memory and the memory circuit included in the each digital pixel, wherein based on a mode of the image sensor device being a first mode, the image sensor device is configured to store a pixel value in the memory, and wherein based on the mode of the image sensor device being a second mode, the image sensor device is further configured to store neural network model-related data in the memory.

In accordance with an aspect of the disclosure, an electronic device includes: a neural network computing device configured to perform a computing operation corresponding to a neural network model; and an image sensor device, including: a pixel array configured to receive optical signals and to convert the received optical signals into electrical signals; and a readout circuit configured to convert the electrical signals into image data and output the image data, wherein the readout circuit includes: an analog-to-digital conversion circuit configured to convert a pixel signal received from the pixel array into a digital signal including a pixel value; and buffer memory configured to store the pixel value, and wherein based on a mode of the image sensor device being a first mode, the image sensor device is configured to store the pixel value in the buffer memory, and wherein based on the mode of the image sensor device being a second mode, the image sensor device is further configured to store neural network model-related data in the buffer memory.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 13 is a block diagram illustrating an electronic device to which an image sensor device applied, according to an embodiment.

DETAILED DESCRIPTION OF THE EMBODIMENTS

Hereinafter, embodiments are disclosed clearly and in detail such that those of ordinary skill in the art could easily carry out the inventive concept.

Figure 1:
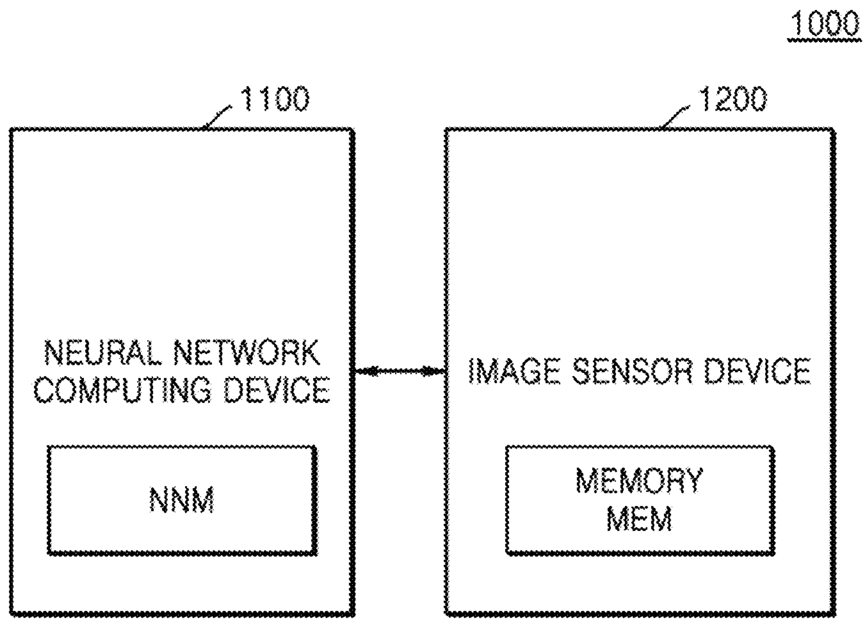
FIG. 1 is a block diagram illustrating an electronic device, according to an embodiment.

FIG. 1 is a block diagram illustrating an electronic device 1000 according to an embodiment.

Referring to FIG. 1, the electronic device 1000 may include a neural network computing device 1100 and an image sensor device 1200. In an embodiment, the electronic device 1000 may be one of various computing systems, such as a personal computer (PC), a laptop computer, a smartphone, a tablet PC, and a digital camera. In an embodiment, the electronic device 1000 may be an edge device. For example, the electronic device 1000 may be an edge device, which does not include a network device, or which requires a real-time response, such as autonomous driving. For example, the electronic device 1000 may correspond to at least one of a drone, a robot device, such as an advanced drivers assistance system (ADAS), a digital camera, a digital video camera, a smart TV, a smartphone, a wearable device, a medical device, a mobile device, an image display device, measuring equipment, a navigation device, an Internet of Things (IoT) device, and other various types of electronic devices.

Hereinafter, for convenience of description, the electronic device 1000 may be described as including an image sensor device. However, embodiments are not limited thereto. The electronic device 1000 may include a sensor, a module, or a device including a memory.

The neural network computing device 1100 may perform neural network computing operations. The neural network computing device 1100 may perform a computing operation of a neural network model (NNM), for example a computing operation corresponding to or associated with a neural network model. For example, the neural network computing device 1100 may perform identification (e.g., at least one of object recognition, image classification, position recognition, and the like) on data from an outside, for example an outside of the neural network computing device 1100 or an outside of the electronic device 1000, based on one or more machine learning (ML) algorithms, for example a convolutional neural network (CNN) algorithm, a deep neural network (DNN) algorithm, and any other type of ML or artificial intelligence (AI) algorithm. For example, the CNN may be trained for various purposes (e.g., general-use object recognition, position recognition, and the like) and implement the various purposes based on a trained model.

The electronic device 1000 may use a large amount of memory resources when performing a neural network computation. Accordingly, a memory size may increase, thereby increasing a chip size. In addition, due to limitations of the memory resources, the neural network computing ability of the electronic device 1000 may be limited. In an embodiment, when the memory resource is insufficient during a computing operation, the electronic device 1000 may use a memory resource of another module or device other than a memory to improve computing performance.

In an embodiment, the neural network computing device 1100 may access a memory of the image sensor device 1200. The neural network computing device 1100 may use the memory of the image sensor device 1200. The neural network computing device 1100 may store data related to a neural network model, which may be referred to as neural network model-related data, in the memory of the image sensor device 1200. Accordingly, an amount of memory resources available for the neural network computing device 1100 may increase.

In an embodiment, the image sensor device 1200 may convert an optical signal of an object, which may be incident through an optical lens, into image data. For example, the image sensor device 1200 may be mounted in an electronic device included as a component in a vehicle, furniture, manufacturing equipment, a door, various kinds of measuring equipment, and the like. The image sensor device 1200 may include a memory MEM.

In an embodiment, the image sensor device 1200 may operate in a first mode or a second mode. The image sensor device 1200 may change the mode in which it is operating under control of the neural network computing device 1100. For example, the image sensor device 1200 may change from the first mode to the second mode in response to or based on a set mode command. As another example, the image sensor device 1200 may change from the second mode to the first mode in response to the set mode command.

In embodiments, the first mode may be a mode in which the image sensor device 1200 may perform an original operation, and the second mode may be a mode in which the image sensor device 1200 may operate as a memory. For example the first mode may be a mode in which the image sensor device 1200 may perform an operation of generating image data by receiving an optical signal and the second mode may be a mode in which data may be written or read under control of the neural network computing device 1100.

In an embodiment, the image sensor device 1200 may share the memory MEM with the neural network computing device 1100. The memory MEM of the image sensor device 1200 may store neural network model-related data. For example, the neural network model-related data may include at least one from among a parameter, a weight, input data, intermediate data, output data, training data, verification data, and any other type of data associated with, corresponding to, or related a neural network model.

For example, the memory MEM may store at least one of input data and a parameter to be provided to the neural network computing device 1100. The memory MEM may store at least one of intermediate data and output data received from the neural network computing device 1100. The memory MEM may store at least one of a pixel value and an image in the first mode. The memory MEM may store neural network model-related data in the second mode.

In an embodiment, the neural network computing device 1100 may implement an intended purpose by sequentially performing calculations or other operations corresponding to a plurality of layers of the neural network model. The neural network computing device 1100 may include a neural network model NNM (which may be, for example, a deep learning model). The neural network computing device 1100 may generate the neural network model NNM. The neural network computing device 1100 may train or learn the neural network model NNM. The neural network computing device 1100 may optimize parameters of the neural network model NNM. The neural network computing device 1100 may perform a computation of the neural network model NNM based on input data. The neural network computing device 1100 may generate an information signal or re-train the neural network model NNM, based on a computation result.

For example, the neural network model NNM may include at least one of various types of neural network models, such as a CNN, a region-based CNN (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, a generative adversarial network (GAN), a transformer, an attention network, and any other type of neural network model, machine learning model, and artificial intelligence model.

The neural network model NNM may be trained and generated by the neural network computing device 1100, and the trained neural network model NNM may be executed by the neural network computing device 1100. Hereinafter, examples are provided in which the neural network model NNM may be a neural network model having configuration parameters (e.g., a network topology, a bias, a weight, and the like) which have been determined through training, but embodiments are not limited thereto. The configuration parameters of the neural network model NNM may be updated through re-training in the neural network computing device 1100, and the updated neural network model NNM (or converted neural network model NNM) may be applied to the neural network computing device 1100.

In an embodiment, the image sensor device 1200 may set the mode thereof to the first mode or the second mode under control of the neural network computing device 1100. The image sensor device 1200 may store a pixel value in the memory MEM in the first mode. The image sensor device 1200 may store neural network model-related data in the memory MEM in the second mode. In the second mode, the image sensor device 1200 may write data in the memory MEM in response to or based on a write command received from the neural network computing device 1100. In the second mode, the image sensor device 1200 may transmit data read from the memory MEM to the neural network computing device 1100 in response to or based on a read command received from the neural network computing device 1100.

Accordingly, an increase in a chip size due to an increase in a memory size may be prevented. The neural network computing performance of the electronic device 1000 may be improved. The size of data which may be processed by the neural network computing device 1100 may increase. For example the electronic device 1000 may provide improved performance. Examples of structure and operation of the electronic device 1000 according to an embodiment are described in more detail with reference to the drawings below.

Figure 2:
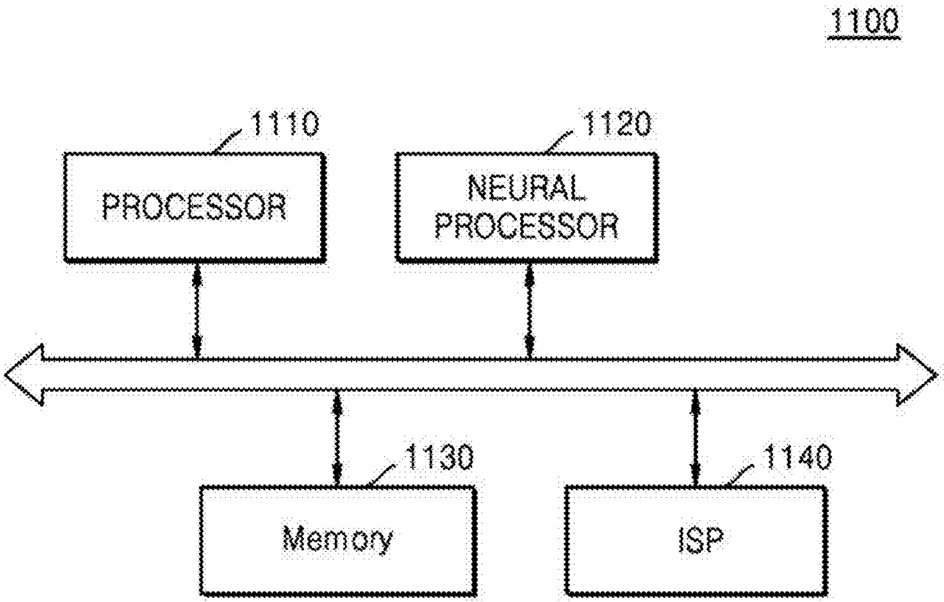
FIG. 2 is a block diagram illustrating a neural network computing device of FIG. 1, according to an embodiment.

FIG. 2 is a block diagram illustrating the neural network computing device 1100 of FIG. 1.

Referring to FIGS. 1 and 2, the neural network computing device 1100 may include a processor 1110, a neural processor 1120, a memory 1130, and an image signal processor (ISP) 1140. The processor 1110 may control a general operation of the neural network computing device 1100. The neural processor 1120 may be a hardware accelerator configured to execute the neural network model NNM. The neural processor 1120 may perform an intended neural network computing operation (e.g., image classification, object recognition, and the like) by sequentially executing the plurality of layers of the neural network model NNM. For example, the neural processor 1120 may correspond to at least one of a neural processing unit (NPU), a tensor processing unit (TPU), a neural engine, and the like, but embodiments are not limited thereto.

For example, as described above, the plurality of layers may include a convolutional layer, a fully connected (FC) layer, a rectified linear unit (ReLU) layer, and a pooling layer. In some embodiments, the plurality of layers may include element-based layers, such as a batch normalization layer, an element-wise layer, and a softmax layer. The neural processor 1120 may perform accelerated processing for each of the plurality of layers described above, through various schemes.

The memory 1130 may be a volatile memory, such as dynamic random access memory (DRAM) or static random access memory (SRAM), for which data may be lost when power is off, or a nonvolatile memory (NVM), such as phase-change random access memory (PRAM), resistive random access memory (ReRAM), magneto-resistive random access memory (MRAM), or ferroelectric random access memory (FRAM), for which data may be maintained even when power is off. The memory 1130 may store various types of data to be used in the neural processor 1120. For example, the memory 1130 may be an input buffer configured to store input data to be input to the neural processor 1120. The memory 1130 may be a parameter buffer configured to store parameters to be used in the neural processor 1120. The memory 1130 may be a buffer configured to store intermediate data generated during a computation of the neural processor 1120. The memory 1130 may be an output buffer configured to store output data output from the neural processor 1120.

The ISP 1140 may receive image data from the image sensor device 1200 and perform various signal processing operations on the received image data. In an embodiment, the ISP 1140 may perform various kinds of signal processing, such as noise cancellation, white balancing, gamma correction, color correction, and color conversion, on the received image data. The signal-processed image data may be transmitted to an external device (e.g., a display device) or stored in a separate storage device.

The neural network computing device 1100 may further include a direct memory access (DMA) engine. The DMA engine may manage or control data transmission and reception between the memory 1130 and the image sensor device 1200. For example the DMA engine may perform a DMA operation between the memory 1130 and the image sensor device 1200. In some embodiments, the DMA engine may manage or control data transmission and reception between the memory 1130 and the neural processor 1120. For example the DMA engine may perform a DMA operation between the image sensor device 1200 and the neural processor 1120.

Figure 3:
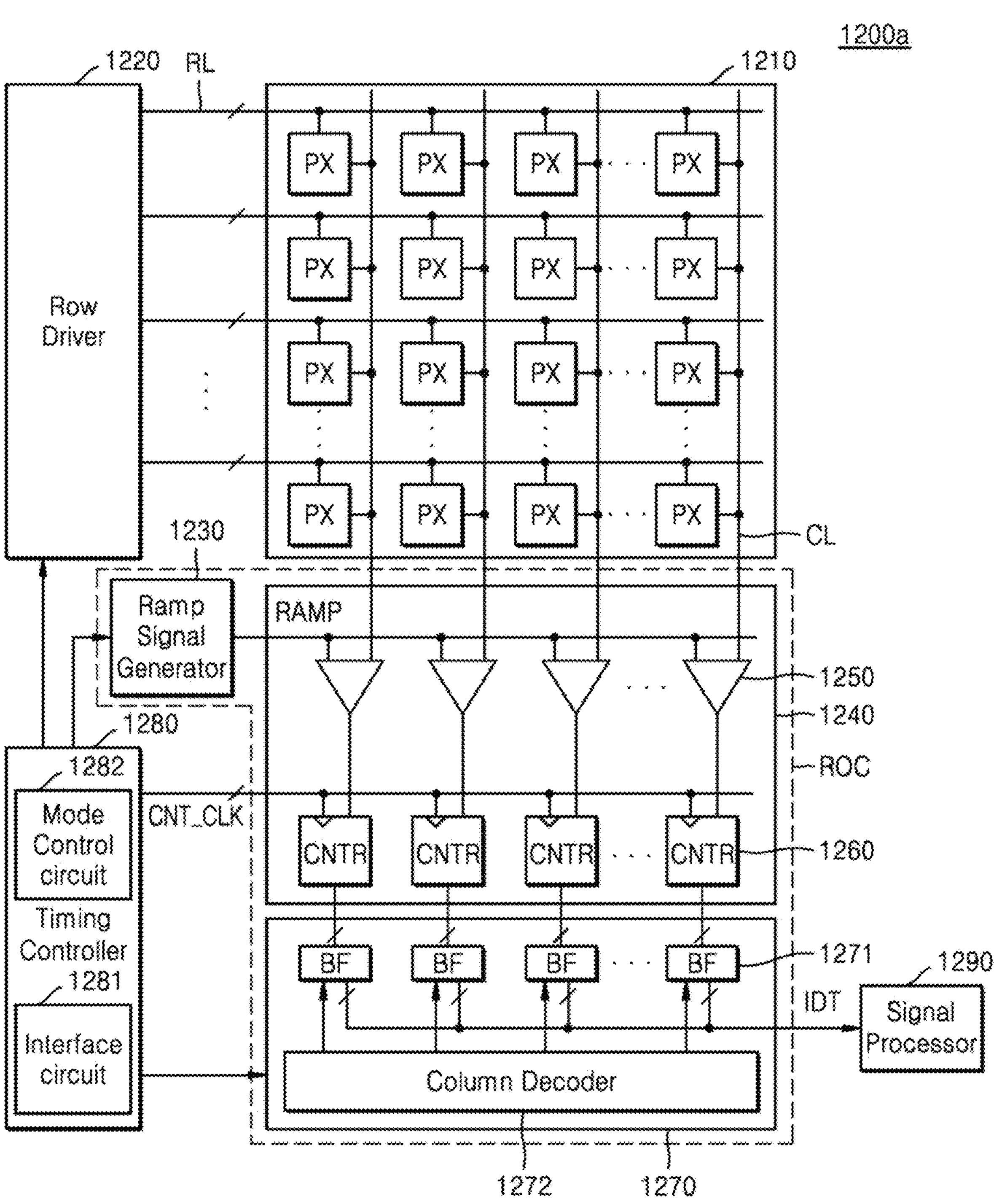
FIG. 3 is a block diagram illustrating an image sensor device of FIG. 1, according to an embodiment.

FIG. 3 is a block diagram illustrating the image sensor device 1200 of FIG. 1.

An image sensor device 1200*a* of FIG. 3 may be one example of the image sensor device 1200 of FIG. 1. Referring to FIG. 3, the image sensor device 1200*a* may include a pixel array 1210, a row driver 1220, a ramp signal generator 1230, an analog-to-digital conversion (ADC) circuit 1240, a data output circuit 1270, and a timing controller 1280. The image sensor device 1200 may further include a signal processor 1290. The image sensor device **1200*a* may include the pixel array 1210 configured to convert received optical signals into electrical signals and a readout circuit ROC configured to convert the electrical signals into image data and output the image data to an outside, for example an outside of the image sensor device 1200*a* or an outside of the electronic device 1000. A structure including the ramp signal generator 1230, the ADC circuit 1240, and the data output circuit 1270 may be referred to as the readout circuit ROC. For example the image sensor device 1200*a*** may include the readout circuit ROC configured to convert electrical signals into image data and output the image data.

The pixel array 1210 may convert received optical signals into electrical signals. The pixel array 1210 may include a plurality of row lines RL, a plurality of column lines CL, and a plurality of pixels PX connected to the plurality of row lines RL and the plurality of column lines CL and arranged in a matrix. The plurality of pixels PX may be an active pixel sensor (APS).

Each of the plurality of pixels PX may include at least one photoelectric conversion element, and a pixel PX may sense light by using a photoelectric conversion element and output an image signal that is an electrical signal according to the sensed light. For example, a photoelectric conversion element may include at least one of a photodiode, phototransistor, a photogate, a pinned photodiode, and the like.

Each of the plurality of pixels PX may sense light of a particular spectral region. For example, the plurality of pixels PX may include a red pixel configured to convert light of a red spectral region into an electrical signal, a green pixel configured to convert light of a green spectral region into an electrical signal, and a blue pixel configured to convert light of a blue spectral region into an electrical signal. In an embodiment, the plurality of pixels PX may have a color arrangement of a Bayer pattern. However, embodiments are not limited thereto, and in some embodiments the plurality of pixels PX may further include a white pixel. As another example, the plurality of pixels PX may include pixels combined with other color components, e.g., a yellow pixel, a cyan pixel, and a magenta pixel.

A color filter array configured to transmit therethrough light of a particular spectral region may be on the plurality of pixels PX, and a color sensible by each of the plurality of pixels PX may be determined according to a color filter on the pixel PX. However, embodiments are not limited thereto. In some embodiments, a particular photoelectric conversion element may convert light of a particular wavelength band into an electrical signal according to the level of an electrical signal applied to the particular photoelectric conversion element.

In an embodiment, each of the plurality of pixels PX may have a pixel structure operable according to a global shutter scheme or a rolling shutter scheme, and the pixel array 1210 may operate according to the global shutter scheme or the rolling shutter scheme. According to the global shutter scheme, the plurality of pixels PX of the pixel array 1210 may have the same exposure start time point and the same exposure interval, and after the exposure interval, the plurality of row lines RL of the pixel array 1210 may be sequentially read, and according to the rolling shutter scheme, the plurality of row lines RL of the pixel array 1210 may be sequentially exposed and sequentially read.

In an embodiment, each of the plurality of pixels PX may have dual conversion gains. The dual conversion gains may include a low conversion gain and a high conversion gain. Herein, a conversion gain may refer to the ratio of charges accumulated in a floating diffusion node, which may be converted into a voltage. Charges generated in a photoelectric conversion element may be transferred to the floating diffusion node and accumulated, and the charges accumulated in the floating diffusion node may be converted into a voltage according to the conversion gain. In this case, the conversion gain may vary according to the capacitance of the floating diffusion node, wherein the conversion gain may decrease as the capacitance increases, and the conversion gain may increase as the capacitance decreases.

In an embodiment, each of the plurality of pixels PX may include at least two photodiodes, and the image sensor device 1200 may provide an auto-focus (AF) function based on pixel signals corresponding to photocharges output from the at least two photodiodes.

The row driver 1220 may drive the pixel array 1210 in a row unit. The row driver 1220 may decode a row control signal (e.g., an address signal) received from the timing controller 1280 and select at least any one row line RL from among the plurality of row lines RL of the pixel array 1210 in response to or based on the decoded row control signal. For example, the row driver 1220 may generate a select signal for selecting one of the plurality of row lines RL. In addition, the pixel array 1210 may output a pixel signal, e.g., a pixel voltage, from the row line RL selected according to the select signal provided from the row driver 1220. The pixel signal may include a reset signal and an image signal. The row driver 1220 may transmit, to the pixel array 1210, control signals for outputting a pixel signal, and a pixel PX may output the pixel signal by operating in response to or based on the control signals.

The ramp signal generator 1230 may generate a ramp signal RAMP (e.g., a ramp voltage), having a level which rises or falls with a certain gradient, under control of the timing controller 1280. The ramp signal RAMP may be provided to each of a plurality of correlated double sampling (CDS) circuits 1250 included in the ADC circuit 1240.

The ADC circuit 1240 may include the plurality of CDS circuits 1250 and a plurality of counters 1260. The ADC circuit 1240 may convert a pixel signal (e.g., a pixel voltage) input from the pixel array 1210 into a pixel value that may be or may be included in a digital signal. Each of pixel signals respectively received through the plurality of column lines CL may be converted into a pixel value that may be or may be included in a digital signal by a CDS circuit 1250 and a counter 1260.

The CDS circuit 1250 may compare a pixel signal, e.g., a pixel voltage, received through a column line CL to the ramp signal RAMP and output a result of the comparison as a comparison signal. The CDS circuit 1250 may output the comparison signal transitioning from a first level (e.g., logic high) to a second level (e.g., logic low) when the level of the ramp signal RAMP is the same as the level of the pixel signal. A time point at which the level of the comparison signal transitions may be determined according to the level of the pixel signal. Hereinafter, for convenience of description, the first level may be referred to as a high level and the second level may be referred to as a low level.

The CDS circuit 1250 may sample a pixel signal provided from a pixel PX, according to a CDS scheme. The CDS circuit 1250 may sample a reset signal received as the pixel signal and compare the reset signal to the ramp signal RAMP to generate a comparison signal according to the reset signal. Thereafter, the CDS circuit 1250 may sample an image signal correlated to the reset signal and compare the image signal to the ramp signal RAMP to generate a comparison signal according to the image signal.

The counter 1260 may count a level transition time point of the comparison signal output from the CDS circuit 1250, based on a counting clock CNT_CLK provided from the timing controller 1280, and output a count value.

In some embodiments, the counter 1260 may be implemented by an up-counter configured to sequentially increase a count value based on the counting clock CNT_CLK and a computing circuit, an up/down counter, or a bit-wise inversion counter.

In an embodiment, the image sensor device 1200*a* may further include a counting code generator configured to generate a counting code (e.g., a gray code), having a value which periodically changes, and provide the counting code to each of the plurality of counters 1260, and the counter 1260 may include a latch circuit and a computing circuit. The latch circuit may latch the code value of a counting code at a time point where the level of a comparison signal transitions. The latch circuit may latch each of a code value, e.g., a reset value, corresponding to a reset signal and a code value, e.g., an image signal value, corresponding to an image signal. The computing circuit may compute the reset value and the image signal value to generate an image signal value from which the reset level of a pixel PX has been removed. The counter 1260 may output, as a pixel value, the image signal value from which the reset level has been removed.

The data output circuit 1270 may temporarily store the pixel value output from the ADC circuit 1240 and then output the temporarily stored pixel value. The data output circuit 1270 may include a plurality of buffer memories 1271 (or buffers BF) and a column decoder 1272. A buffer memory 1271 stores a pixel value received from a corresponding counter 1260. In some embodiments, each of the plurality of buffer memories 1271 may be included in a counter 1260. A plurality of pixel values stored in the plurality of buffer memories 1271 may be output as image data IDT under control of the column decoder 1272. The plurality of buffer memories 1271 may correspond to the memory MEM of the image sensor device 1200 of FIG. 1.

In an embodiment, the plurality of buffer memories 1271 may store or provide data under control of the neural network computing device 1100. The plurality of buffer memories 1271 may store data related to a neural network computation. The plurality of buffer memories 1271 may store at least one of a parameter, input data, intermediate data, output data, and the like. The plurality of buffer memories 1271 may output stored data to the neural network computing device 1100 in response to or based on a read command received from the neural network computing device 1100. The plurality of buffer memories 1271 may store data in response to or based on a write command received from the neural network computing device 1100.

The timing controller 1280 may output a control signal to each of the row driver 1220, the ramp signal generator 1230, the ADC circuit 1240, and the data output circuit 1270 to control operations or timings of the row driver 1220, the ramp signal generator 1230, the ADC circuit 1240, and the data output circuit 1270. For example the timing controller 1280 may control a general operation or timing of the image sensor device 1200*a*.

In an embodiment, the timing controller 1280 may include an interface circuit 1281 and a mode control circuit 1282. The interface circuit 1281 may communicate with the neural network computing device 1100. The interface circuit 1281 may transmit and receive a packets to and from the neural network computing device 1100. A packet transmitted from the neural network computing device 1100 to the interface circuit 1281 may include at least one of a command, data to be recorded in the plurality of buffer memories 1271, and the like. A packet transmitted from the interface circuit 1281 to the neural network computing device 1100 may include at least one of a response to the command, data read from the plurality of buffer memories 1271, and the like.

The interface circuit 1281 may generate a packet according to a protocol of an interface negotiated with the neural network computing device 1100. The interface circuit 1281 may parse various kinds of information from a packet received from the neural network computing device 1100.

The mode control circuit 1282 may manage the mode of the image sensor device 1200*a*. The mode control circuit 1282 may set the mode of the image sensor device 1200*a* to the first mode or the second mode in response to or based on a set mode command. The mode control circuit 1282 may change the mode from the first mode to the second mode or from the second mode to the first mode in response to or based on a set mode command received from the neural network computing device 1100.

The signal processor 1290 may perform noise reduction processing, gain adjustment, waveform shaping, interpolation processing, white balance processing, gamma processing, edge enhancement processing, binning, and the like on the image data IDT. In some embodiments, the signal processor 1290 may be included in an external processor outside the image sensor device 1200*a*.

In an embodiment, although examples are described above in which the plurality of pixels PX included in the image sensor device 1200*a* sense red (R), green (G), and blue (B) colors (e.g., RGB colors), the plurality of pixels PX may separately detect light of a different wavelength band. For example, a pixel PX may sense an ultraviolet (UV) or infrared (IR) wavelength band. The image sensor device 1200*a* may generate an RGB image or a hyperspectral image of the UV or IR wavelength band. The image sensor device 1200*a* may include one or more pixels among RGB pixels, black and white (BW) pixels, IR pixels, or UV pixels.

According to embodiments, the image sensor device 1200*a* may generate a raw image corresponding to a subject by converting light emitted or reflected from the subject into an electrical signal. For example, the image sensor device 1200*a* may include at least one image sensor for example an RGB sensor, a BW sensor, an IR sensor, and a UV sensor, having different attributes, a plurality of image sensors having the same attribute, and a plurality of image sensors having different attributes.

As described above, the image sensor device 1200*a* may include the pixel array 1210 configured to convert received optical signals into electrical signals and the readout circuit ROC configured to convert the electrical signals into image data and output the image data. The readout circuit ROC may include the ADC circuit 1240 configured to convert a pixel signal received from the pixel array 1210 into a pixel value that may be, or may be included in, a digital signal, and the buffer memory 1271 configured to store the pixel value. The memory MEM of the image sensor device 1200 of FIG. 1 may indicate the buffer memory 1271.

Figure 4A:
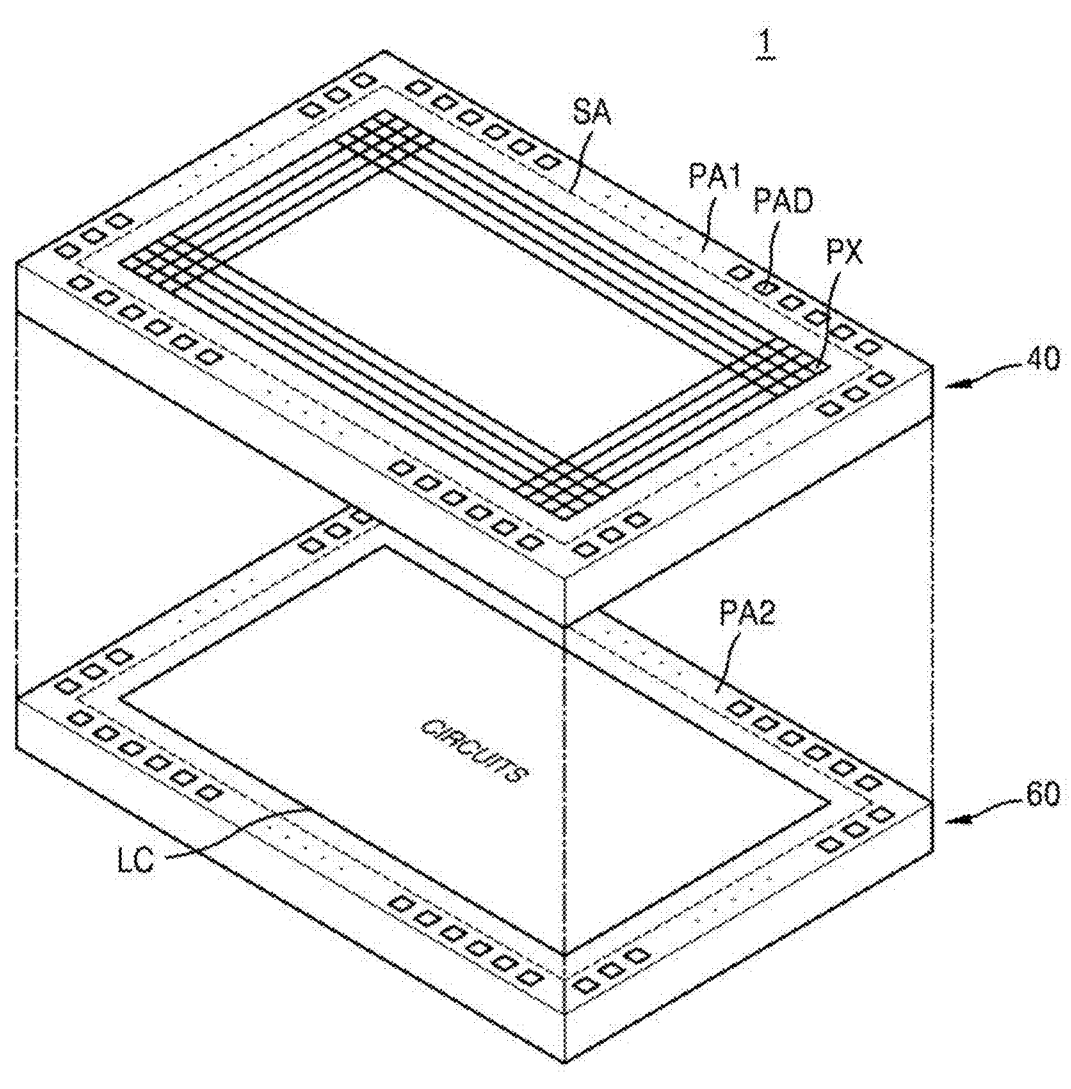
FIGS. 4A and 4B are perspective views illustrating stack structures of the image sensor device of FIG. 1, according to an embodiment.
Figure 4B:
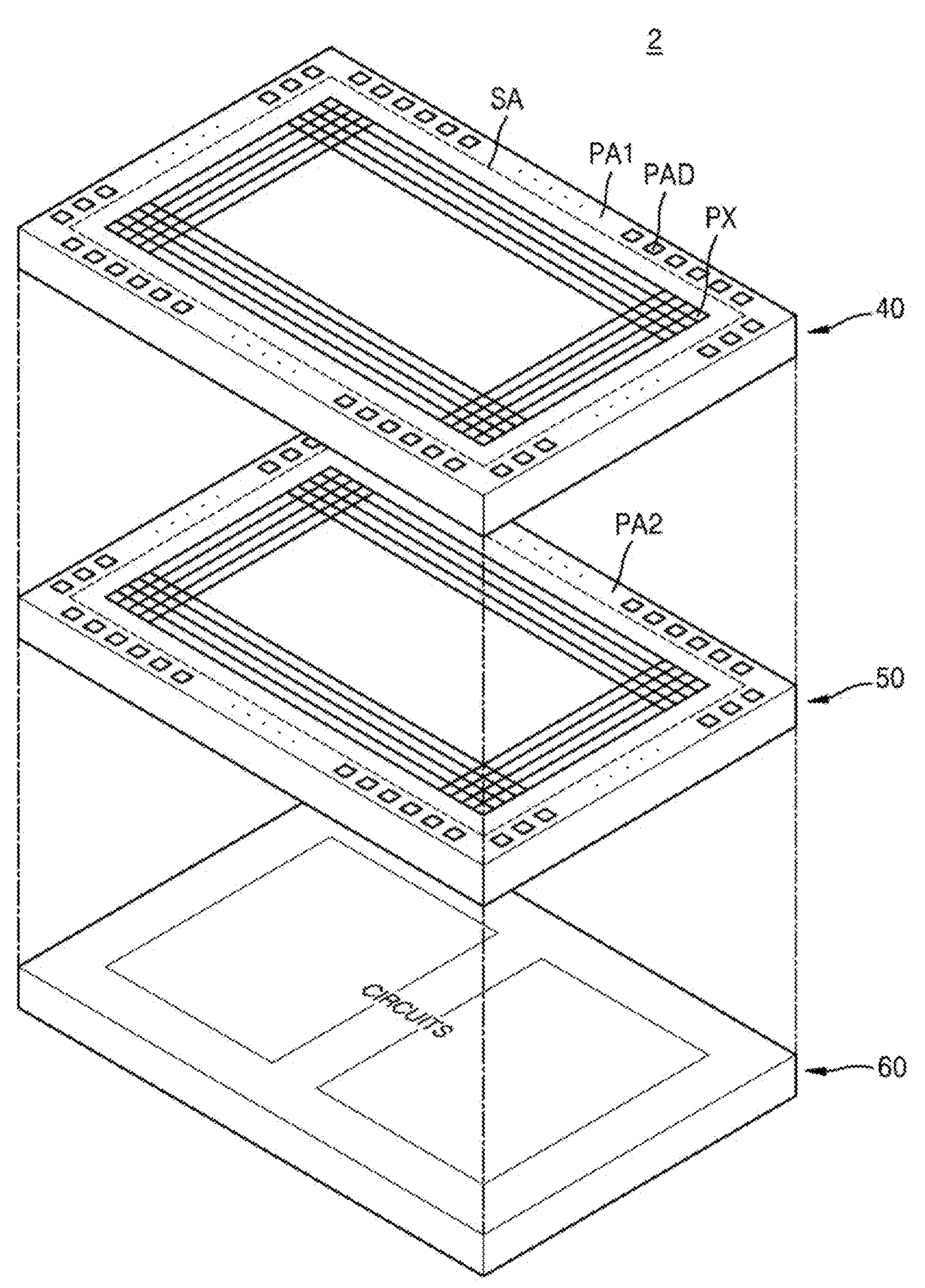

FIGS. 4A and 4B are perspective views illustrating stack structures of the image sensor device 1200 of FIG. 1.

Referring to FIGS. 3 and 4A, an image sensor device 1 may correspond to the image sensor device 1200*a* of FIG. 3. The image sensor device 1 may include an upper chip 40 and a lower chip 60. The upper chip 40 may include a sensing area SA in which a plurality of pixels PX are provided, a circuit area LC in which elements configured to drive the plurality of pixels PX are provided, and a pad area PA in the surroundings of the sensing area SA and the circuit area LC. A plurality of upper pads PAD may be arranged in the pad area PA and connected, through vias and the like, to the elements provided to the lower chip 60.

The lower chip 60 may include the circuit area LC in which peripheral circuits, e.g., the row driver 1220, the ADC circuit 1240, the ramp signal generator 1230, the data output circuit 1270, the timing controller 1280, and the signal processor 1290, of the pixel array 1210 may be formed. In an embodiment, the lower chip 60 may include a memory area and a dummy area. In the memory area, memory devices, such as DRAM devices or SRAM devices, may be arranged. However, the memory devices arranged in the memory area are not limited to the DRAM devices or the SRAM devices. The dummy area may not store data but support the upper chip 40. In an embodiment, the memory MEM of the image sensor device 1200 may correspond to the memory area of the lower chip 60.

Referring to FIG. 4B, an image sensor device 2 may correspond to the image sensor device 1200*a* of FIG. 3. The image sensor device 2 may include a plurality of chips that are stacked. The image sensor device 2 may include the upper chip 40, an intermediate chip 50, and the lower chip 60. For example, the pixel array 1210 may be formed in the upper chip 40 and the intermediate chip 50, and peripheral circuits of the pixel array 1210 or a memory may be formed in the lower chip 60.

The lower chip 60 may include the circuit area LC in which the peripheral circuits of the pixel array 1210 may be formed. In an embodiment, the lower chip 60 may include a memory area and a dummy area. In an embodiment, the memory MEM of the image sensor device 1200 may correspond to the memory area of the lower chip 60. In an embodiment, the upper chip 40 and the intermediate chip 50 may be stacked in a wafer level, and the lower chip 60 may be attached to the bottom of the intermediate chip 50 in a chip level.

Figure 5:
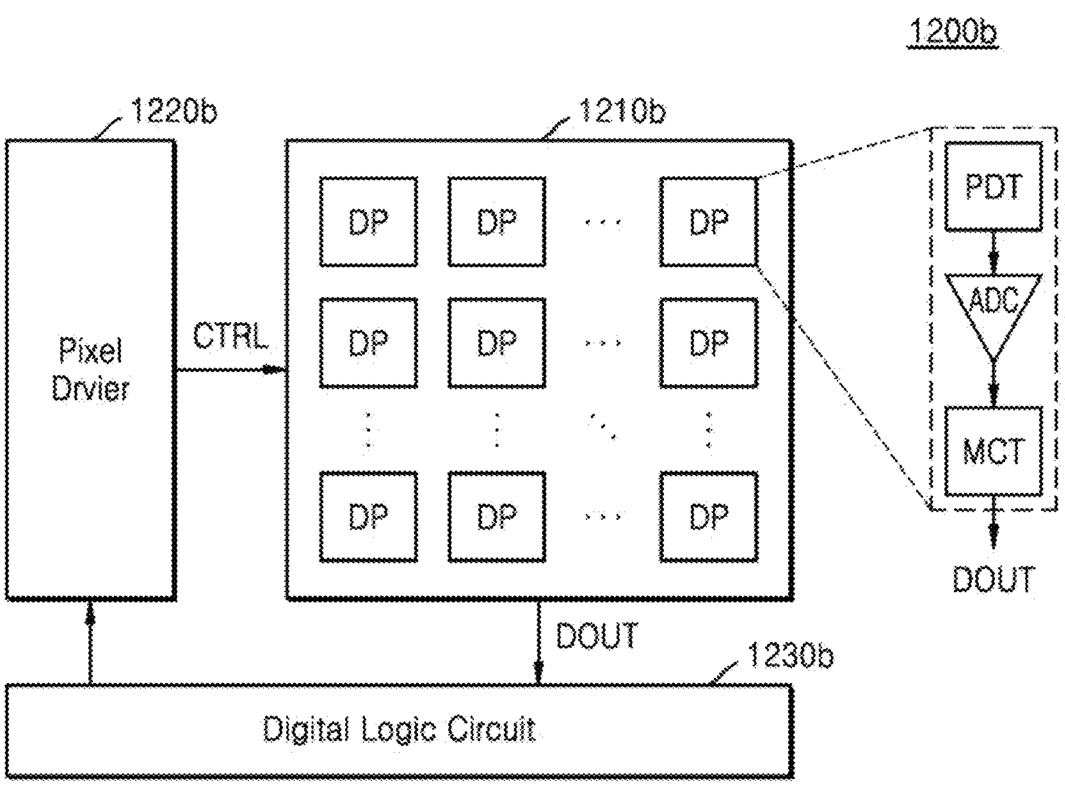
FIG. 5 is a block diagram illustrating the image sensor device of FIG. 1, according to an embodiment.

FIG. 5 is a block diagram illustrating the image sensor device 1200 of FIG. 1.

An image sensor device 1200*b* of FIG. 5 may be an example of the image sensor device 1200 of FIG. 1. Referring to FIG. 5, the image sensor device 1200*b* may include a pixel array 1210*b*, a pixel driver 1220*b*, and a digital logic circuit 1230*b*.

The pixel array 1210*b* may convert received optical signals into electrical signals. According to embodiments, complementary metal oxide semiconductor (CMOS) image sensor (CIS)-based image pixels may convert optical signals into analog signals and output the analog signals, and the analog signals may be converted into a digital signal in a column unit by a separate ADC circuit. For example, while transmitting the analog signals converted by the CIS-based image pixels to the ADC circuit, noise or coupling may occur, thereby decreasing final image quality.

The pixel array 1210*b* according to an embodiment may include a plurality of digital pixels DP. Each of the plurality of digital pixels DP may sense an optical signal from the outside and output a digital signal DOUT corresponding to the sensed optical signal.

For example, a digital pixel DP may include a photodetector PDT, an analog-to-digital converter ADC, and a memory circuit MCT. The photodetector PDT may convert an optical signal sensed from the outside into an electrical signal (e.g., an analog signal). The analog-to-digital converter ADC may convert the analog signal output from the photodetector PDT into a digital signal DOUT. The memory circuit MCT may store the digital signal DOUT converted by the analog-to-digital converter ADC. Under control of the pixel driver 1220*b*, the memory circuit MCT included in each of the plurality of digital pixels DP may output the stored digital signal DOUT.

The pixel driver 1220*b* may output a control signal CTRL for controlling the plurality of digital pixels DP included in the pixel array 1210*b*. Based on the control signal CTRL generated by the pixel driver 1220*b*, each of the plurality of digital pixels DP may perform a series of pixel operations or image detection operations, such as an operation of generating an analog signal by detecting an optical signal, an operation of converting the analog signal into a digital signal, an operation of storing the digital signal, and an operation of outputting the stored digital signal.

The digital logic circuit 1230*b* may perform digital signal processing on digital signals DOUT received from the pixel array 1210*b* and may provide final image data to an external device (e.g., at least one of an ISP, an application processor (AP), and the like).

Unlike some CIS devices, each of the plurality of digital pixels DP may generate and output the digital signal DOUT in a pixel level. Therefore, deformation of the digital signals DOUT output from the plurality of digital pixels DP may be reduced and an image signal may be processed at a high speed.

As described above, the pixel array 1210*b* of the image sensor device 1200*b* may include the plurality of digital pixels DP. The memory MEM of the image sensor device 1200 of FIG. 1 may correspond to respective memory circuits of the plurality of digital pixels DP. In some embodiments, the memory MEM may correspond to a buffer memory 1235*b* (as shown for example in FIG. 6B). In some embodiments, the memory MEM may refer to both the respective memory circuits of the plurality of digital pixels DP and the buffer memory 1235*b* (as shown for example in FIG. 6B).

Figure 6A:
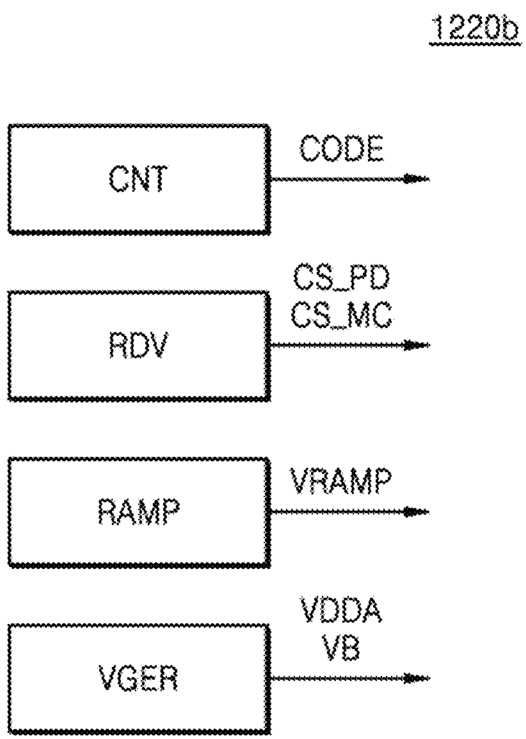
FIG. 6A is a block diagram illustrating a pixel driver of FIG. 5, according to an embodiment.

FIG. 6A is a block diagram illustrating the pixel driver 1220*b* of FIG. 5.

Referring to FIGS. 5 and 6A, the pixel driver 1220*b* may include a row driver RDV, a counter CNT, a ramp generator RAMP, and a voltage generator VGER.

The row driver RDV may generate a control signal for controlling each of the plurality of digital pixels DP. For example, the row driver RDV may generate a photodetector control signal CS_PD for controlling the photodetector PDT of each of the plurality of digital pixels DP. The row driver RDV may generate a memory control signal CS_MC for controlling the memory circuit MCT (or for example a memory cell) of each of the plurality of digital pixels DP.

The counter CNT may output a code CODE. For example, the counter CNT may sequentially increase or decrease the value of the code CODE in response to or based on a predefined clock (e.g., an operating clock) for a predefined time. For example the value of the code CODE may sequentially change with time.

The ramp generator RAMP may output a ramp signal VRAMP. The ramp signal VRAMP may be used as a reference signal to be compared to an analog signal in a digital pixel DP. In an embodiment, the ramp signal VRAMP may be a constantly decreasing or increasing signal (e.g., an increasing/decreasing signal having a single gradient).

The voltage generator VGER may generate various voltages (e.g., a power source voltage VDDA, a bias voltage VB, and the like) used to operate the image sensor device 1200*b*. For example, the photodetector control signal CS_PD, the memory control signal CS_MC, the code CODE, and the ramp signal VRAMP may be included in the control signal CTRL described with reference to FIG. 5. For example, each of the plurality of digital pixels DP included in the pixel array 1210*b* may operate based on various signals (e.g., CODE, CS_PD, CS_MC, VRAMP, VDDA, VB, and the like) generated by the pixel driver 1220*b*, examples of which are described with reference to FIG. 6A.

Figure 6B:
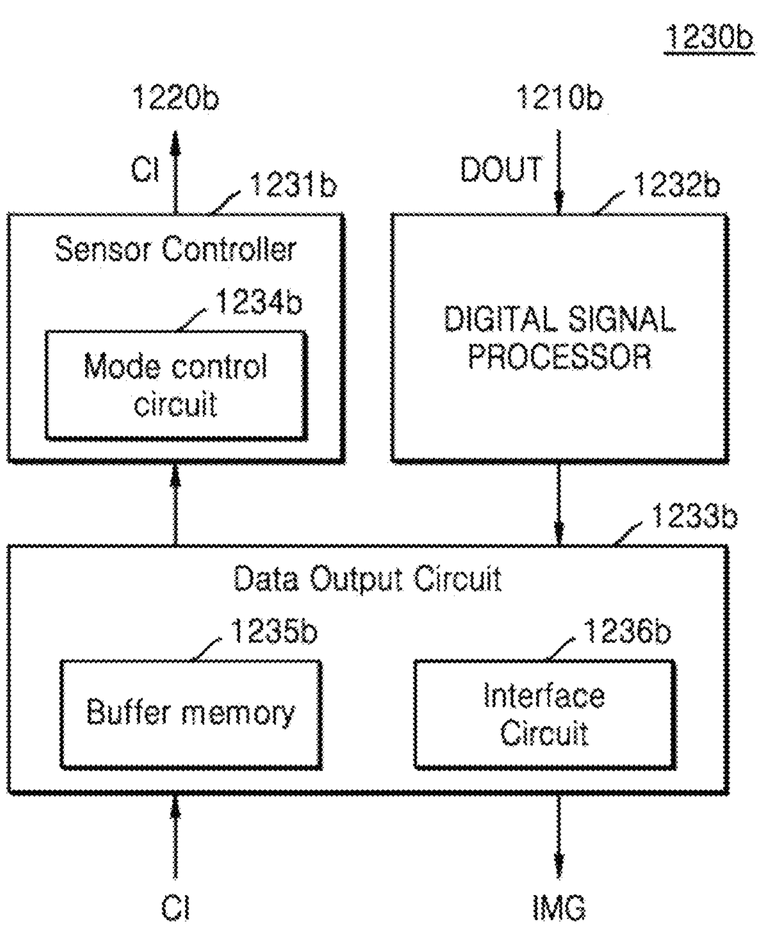
FIG. 6B is a block diagram illustrating a digital logic circuit of FIG. 5, according to an embodiment.

FIG. 6B is a block diagram illustrating the digital logic circuit 1230*b* of FIG. 5.

Referring to FIGS. 5 and 6B, the digital logic circuit 1230*b* may include a sensor controller 1231*b*, a digital signal processor 1232*b*, and a data output circuit 1233*b*.

The sensor controller 1231*b* may control a general operation of the image sensor device 1200*b*. For example, the sensor controller 1231*b* may control a general operation of the image sensor device 1200*b* based on control information CI provided from an external device (e.g., at least one of an ISP, an AP, and the like) through the data output circuit 1233*b*. The sensor controller 1231*b* may be a timing controller configured to control an operation timing of the pixel driver 1220*b*. For example, the pixel driver 1220*b* may generate the various signals described above, based on timing signals from the sensor controller 1231*b*.

The sensor controller 1231*b* may include a mode control circuit 1234*b*. The mode control circuit 1234*b* may manage the mode of the image sensor device 1200*b*. The mode control circuit 1234*b* may set the mode of the image sensor device 1200*b* to the first mode or the second mode in response to or based on a set mode command. The mode control circuit 1234*b* may change the mode from the first mode to the second mode or from the second mode to the first mode in response to or based on a set mode command received from the neural network computing device 1100.

The digital signal processor 1232*b* may receive digital signals DOUT from the pixel array 1210*b* and perform digital signal processing on the received digital signals DOUT. For example, a digital signal DOUT output from one digital pixel DP may include a reset sampling value and a signal sampling value. The digital signal processor 1232*b* may determine a final digital value corresponding to an optical signal sensed by the one digital pixel DP, by performing a computing operation on the reset sampling value and the signal sampling value.

The final image data IMG may be generated by combining final digital values respectively determined in the plurality of digital pixels DP. For example a CDS operation may be implemented using a digital signal DOUT generated by an operation of the analog-to-digital converter ADC (or for example a comparator) included in a digital pixel DP and a digital signal processing operation of the digital signal processor 1232*b* included in the digital logic circuit 1230*b*.

The data output circuit 1233*b* may receive the control information CI from an external device (e.g., at least one of an ISP, an AP, and the like) or output the final image data IMG. The data output circuit 1233*b* may include a buffer memory 1235*b* and an interface circuit 1236*b*.

In an embodiment, the buffer memory 1235*b* may temporarily store the digital signal DOUT or the final image data IMG. The buffer memory 1235*b* may correspond to the memory MEM of the image sensor device 1200 of FIG. 1.

In an embodiment, the buffer memory 1235*b* may store or provide data under control of the neural network computing device 1100. The buffer memory 1235*b* may store data related to a neural network computation. The buffer memory 1235*b* may store at least one of a parameter, input data, intermediate data, output data, and the like. The buffer memory 1235*b* may output stored data to the neural network computing device 1100 in response to or based on a read command received from the neural network computing device 1100. The buffer memory 1235*b* may store data in response to or based on a write command received from the neural network computing device 1100.

In an embodiment, the interface circuit 1236*b* may communicate with the neural network computing device 1100. The interface circuit 1236*b* may transmit and receive packets to and from the neural network computing device 1100. A packet transmitted from the neural network computing device 1100 to the interface circuit 1236*b* may include a command. The packet transmitted from the neural network computing device 1100 to the interface circuit 1236*b* may include data, which is to be recorded in at least one of the buffer memory 1235*b* the memory circuit MCT of a digital pixel DP, and the like. A packet transmitted from the interface circuit 1236*b* to the neural network computing device 1100 may include a response to the command, data read from at least one of the plurality of buffer memories 1271, the memory circuit MCT of the digital pixel DP, and the like.

The interface circuit 1236*b* may generate a packet according to a protocol of an interface negotiated with the neural network computing device 1100. The interface circuit 1236*b* may parse various kinds of information from a packet received from the neural network computing device 1100. For example, the interface circuit 1236*b* may transmit and receive the information described above to and from an external device, based on a predefined protocol. For example, the interface circuit 1236*b* may include a physical layer configured to support the predefined protocol.

Figure 6C:
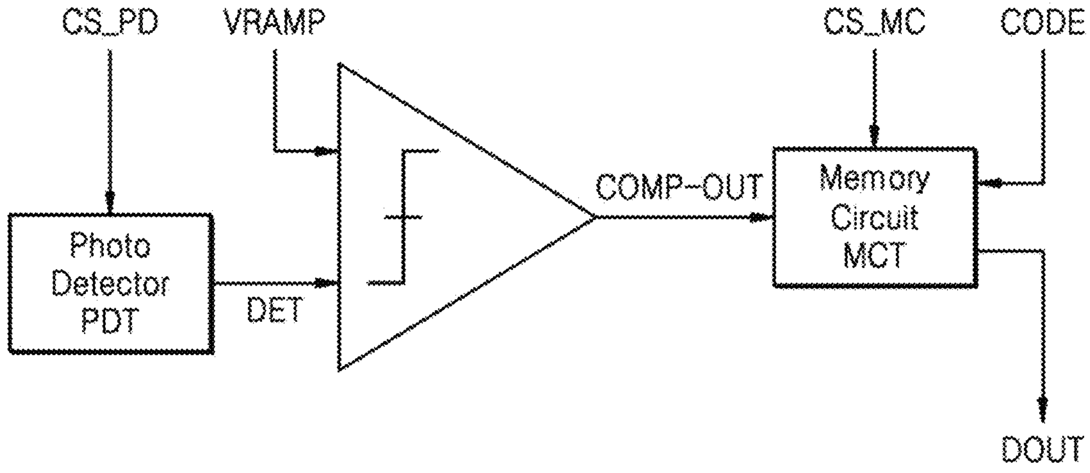
FIG. 6C is a block diagram illustrating a digital pixel of FIG. 5, according to an embodiment.

FIG. 6C is a block diagram illustrating a digital pixel DP of FIG. 5.

Referring to FIGS. 5 and 6C, the digital pixel DP may operate in response to or based on the control signal CTRL (e.g., at least one of CS_PD, CS_MC, CODE, VRAMP, and the like) output from the pixel driver 1220*b*. For example, the digital pixel DP may include a photodetector PDT, an analog-to-digital converter ADC, and a memory circuit MCT.

The photodetector PDT may detect an optical signal incident from the outside and output a detection signal DET corresponding to the detected optical signal. For example, the photodetector PDT may detect an optical signal in response to or based on the photodetector control signal CS_PD from the row driver RDV (as shown for example in FIG. 6A) and output the detection signal DET corresponding to the detected optical signal. In an embodiment, the detection signal DET may be an analog signal.

The analog-to-digital converter ADC may compare the detection signal DET to the ramp signal VRAMP and output a comparison signal COMP-OUT. For example, when the ramp signal VRAMP is higher than the detection signal DET, the comparison signal COMP-OUT may have the high level, and when the ramp signal VRAMP is lower than the detection signal DET, the comparison signal COMP-OUT may have the low level. However, embodiments are not limited thereto.

The memory circuit MCT may store the code CODE or output the stored code CODE as a digital signal DOUT, in response to or based on the comparison signal COMP-OUT and the memory control signal CS_MC. For example, the memory circuit MCT may include a plurality of memory cells. The plurality of memory cells may store the code CODE in response to or based on the comparison signal COMP-OUT and the memory control signal CS_MC. The plurality of memory cells of the memory circuit MCT may output the stored code CODE as the digital signal DOUT in response to or based on the memory control signal CS_MC.

The memory circuits MCT of the plurality of digital pixels DP may correspond to the memory MEM of the image sensor device 1200 of FIG. 1. For example, the memory MEM of the image sensor device 1200 of FIG. 1 may indicate a set of the memory circuits MCT of the plurality of digital pixels DP of the pixel array 1210*b*. In an embodiment, the memory circuit MCT of each of the plurality of digital pixels DP may store or provide data under control of the neural network computing device 1100. The memory circuit MCT of each of the plurality of digital pixels DP may store data related to a neural network computation. The memory circuit MCT of each of the plurality of digital pixels DP may store at least one of a parameter, input data, intermediate data, output data, training data, verification data, and the like. The memory circuit MCT of each of the plurality of digital pixels DP may output the stored data to the neural network computing device 1100 in response to or based on a read command received from the neural network computing device 1100. The memory circuit MCT of each of the plurality of digital pixels DP may store data in response to or based on a write command received from the neural network computing device 1100.

Figure 6D:
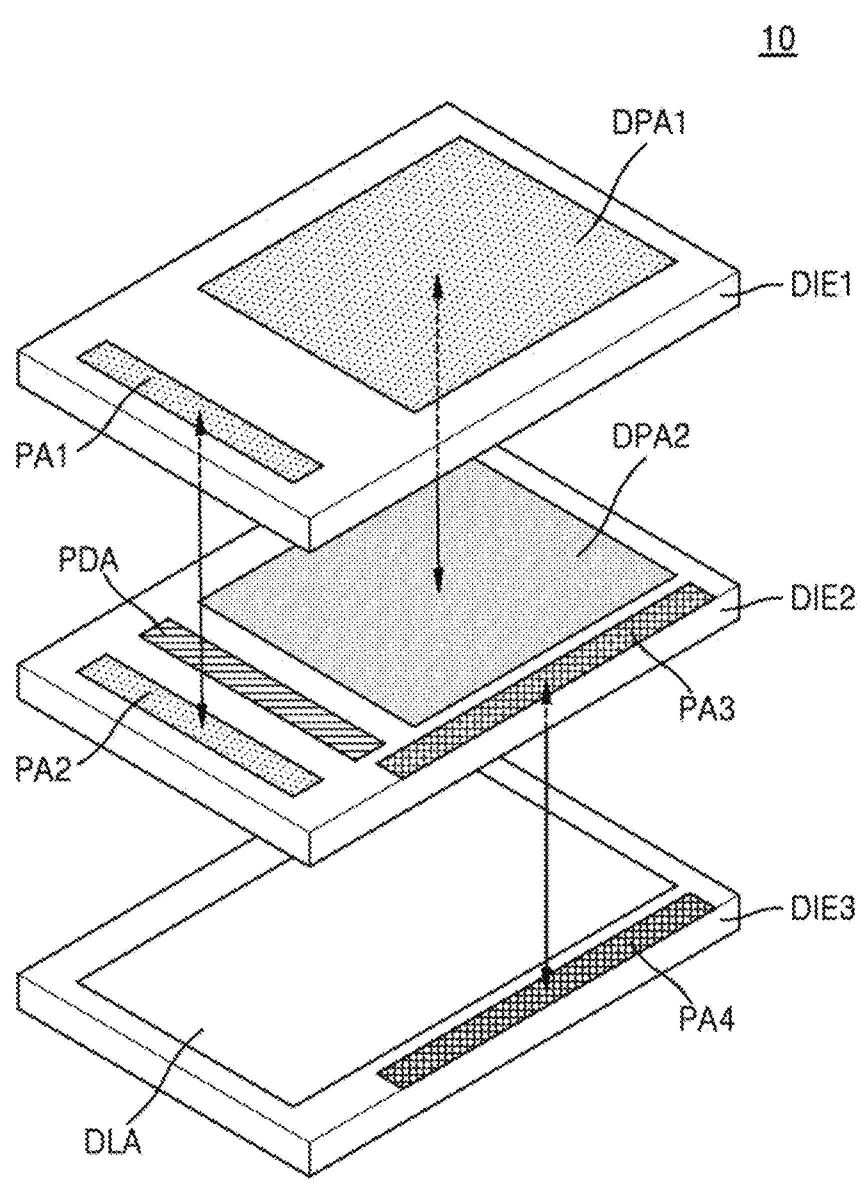
FIG. 6D is a perspective view illustrating a stack structure of the image sensor device of FIG. 1, according to an embodiment.

FIG. 6D is a perspective view illustrating a stack structure of the image sensor device 1200 of FIG. 1.

A perspective view of an image sensor device 10 is described with reference to FIG. 6D. The image sensor device 10 of FIG. 6D may correspond to the image sensor device 1200*b* of FIG. 5. An example of the image sensor device 1200*b* according to an embodiment is described in view of a physical structure. For example with reference to FIG. 6D, an embodiment is described based on semiconductor dies included in an electronic device (or an image device) according to an embodiment. For ease of description, components shown in FIG. 6D are are illustrated in a simplified manner, and the structure shown in FIG. 6D may not precisely correspond to an actual implementation of a semiconductor wafer, semiconductor chip, semiconductor die, semiconductor package, and the like, according to embodiments.

Referring to FIGS. 5 and 6D, the image sensor device 10 may include first semiconductor die DIE1, second semiconductor die DIE2, and third semiconductor die DIE3. The first to third semiconductor dies DIE1, DIE2, and DIE3 may be produced by different semiconductor processes or produced from different semiconductor wafers, respectively.

The first semiconductor die DIE1 may be on, and may be electrically connected to, the second semiconductor die DIE2. The second semiconductor die DIE2 may be on, and may be electrically connected to, the third semiconductor die DIE3. For example, the second semiconductor die DIE2 may be between the first semiconductor die DIE1 and the third semiconductor die DIE3.

The first semiconductor die DIE1 may include a first digital pixel area DPA1 and a first pad area PA1. The first digital pixel area DPA1 and the first pad area PA1 may be physically separated from each other or spaced apart from each other by a certain distance.

The first digital pixel area DPA1 may be an area for forming a portion of each of the plurality of digital pixels DP. For example, as described above, each of the plurality of digital pixels DP may include the photodetector PDT, the analog-to-digital converter ADC, and the memory circuit MCT. The photodetector PDT of each of the plurality of digital pixels DP and a portion of the analog-to-digital converter ADC of each of the plurality of digital pixels DP may be formed in the first digital pixel area DPA1 of the first semiconductor die DIE1.

The first pad area PA1 may be an area for forming a plurality of pads connected to a second pad area PA2 of the second semiconductor die DIE2. The first pad area PA1 may be connected to elements in the first digital pixel area DPA1 through a metal layer formed in the first semiconductor die DIE1.

The second semiconductor die DIE2 may include a second digital pixel area DPA2, the second pad area PA2, a pixel driver area PDA, and a third pad area PA3. The second digital pixel area DPA2 may include remaining components, which may be not formed in the first digital pixel area DPA1 of the first semiconductor die DIE1, among the components of each of the plurality of digital pixels DP. For example, the remaining components, which are not formed in the first digital pixel area DPA1, in the analog-to-digital converter ADC of each of the plurality of digital pixels DP and the memory circuit MCT of each of the plurality of digital pixels DP may be formed in the second digital pixel area DPA2.

In an embodiment, the portion of the analog-to-digital converter ADC formed in the first digital pixel area DPA1 of the first semiconductor die DIE1 and the remaining portion of the analog-to-digital converter ADC formed in the second digital pixel area DPA2 of the second semiconductor die DIE2 may be connected to a connection structure formed on a plane corresponding to the first digital pixel area DPA1 or the second digital pixel area DPA2. In an embodiment, the connection structure may be an element or a material, such as copper (Cu)-to-Cu bonding, a through silicon via (TSV), or a backside via stack (BVS) which may bond between semiconductor dies.

The pixel driver area PDA may be an area for forming the pixel driver 1220*b* described above. In the pixel driver area PDA, some analog circuits, such as the row driver RDV, the ramp generator RAMP, the counter CNT, and the voltage generator VGER, may be formed.

The second pad area PA2 may be an area for forming a plurality of pads connected to the first pad area PA1. The plurality of pads of the second pad area PA2 may be connected to the plurality of pads of the first pad area PA1 through the connection structure, respectively. In an embodiment, the connection structure may be an element or a material, such as Cu-to-Cu bonding, a TSV, or a BVS, which may bond between semiconductor dies.

The third pad area PA3 may be an area for forming a plurality of pads connected to the third semiconductor die DIE3. In an embodiment, various elements included in the second digital pixel area DPA2, the second pad area PA2, the pixel driver area PDA, and the third pad area PA3 may be connected to each other through a metal layer of the second semiconductor die DIE2.

The third semiconductor die DIE3 may include a digital logic circuit area DLA and a fourth pad area PA4. The digital logic circuit area DLA may be an area for forming the digital logic circuit 1230*b* described above. The fourth pad area PA4 may be an area for forming a plurality of pads. The plurality of pads of the fourth pad area PA4 may be respectively connected to the plurality of pads of the third pad area PA3 through a connection structure. In an embodiment, the connection structure may be an element or a material, such as Cu-to-Cu bonding, a TSV, or a BVS, which may bond between semiconductor dies.

In an embodiment, the first digital pixel area DPA1 of the first semiconductor die DIE1 and the second digital pixel area DPA2 of the second semiconductor die DIE2 may be arranged to overlap each other in the same plane area and may be areas, such as a pixel core area, for forming a plurality of digital pixels.

The remaining areas of the first and second semiconductor dies DIE1 and DIE2 except for the first and second digital pixel areas DPA1 and DPA2 may be an area, as a peripheral area (or for example a peripheral circuit area), for forming a connection structure between semiconductor dies, a driving circuit, an analog circuit, and the like. In an embodiment, circuit or physical components configured to operate based on a digital signal in the image sensor device 10 may be formed in the third semiconductor die DIE3.

As described above, a memory of the image sensor device 10 may be formed in the second semiconductor die DIE2 or the third semiconductor die DIE3. The electronic device 1000 may efficiently use a memory resource by using the memory of the image sensor device 10.

Figure 7:
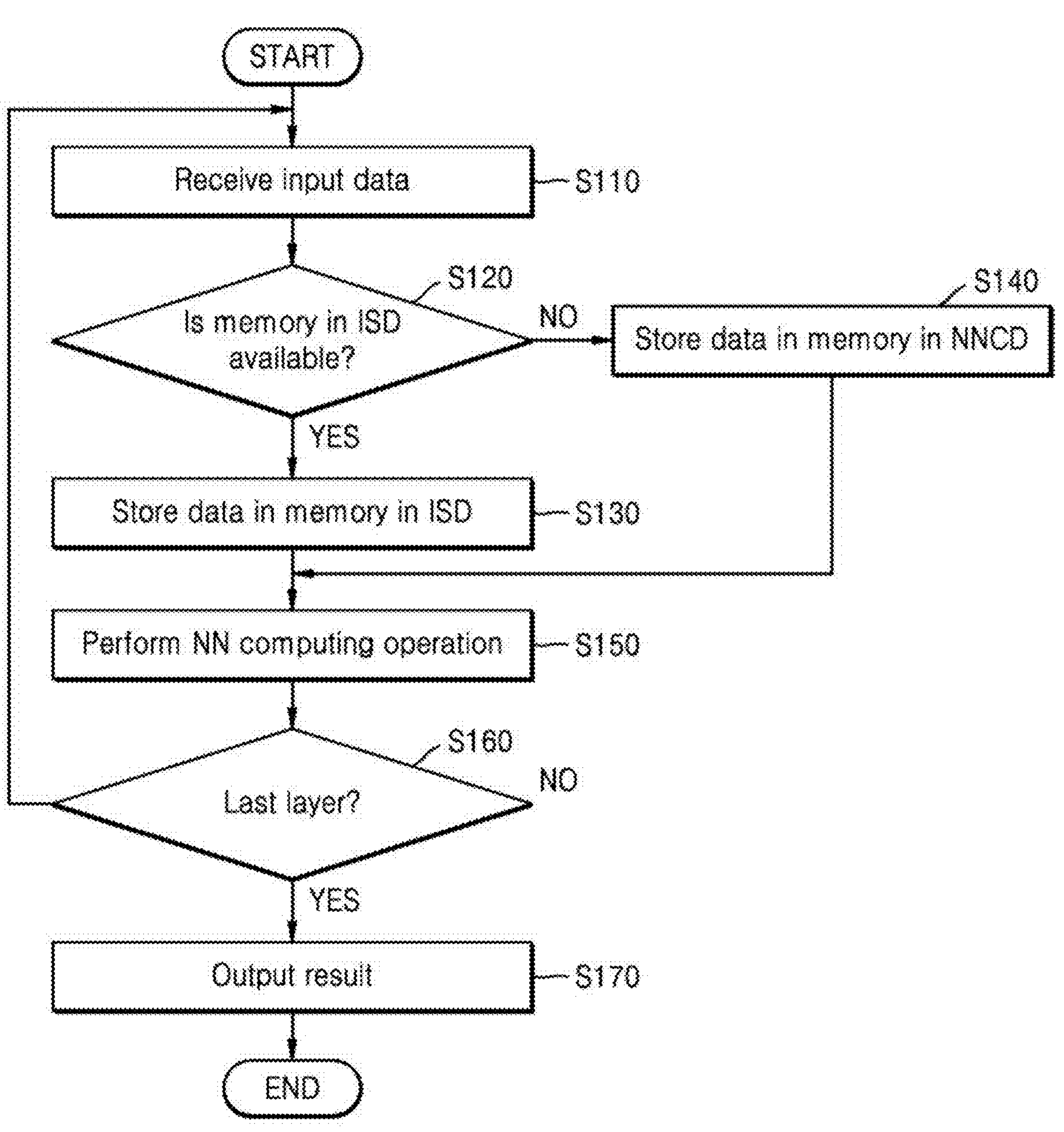
FIG. 7 is a flowchart illustrating an operating method of the electronic device of FIG. 1, according to an embodiment.

FIG. 7 is a flowchart illustrating an operating method of the electronic device 1000 of FIG. 1.

Referring to FIGS. 1 and 7, at operation S110, the electronic device 1000 may receive input data. The input data may refer to input data of a neural network model. The electronic device 1000 may receive the input data from the outside. At operation S120, the electronic device 1000 may determine whether the memory MEM of the image sensor device 1200 is available. For example, the neural network computing device 1100 may receive status information about the image sensor device 1200 using a get status command. The neural network computing device 1100 may determine, based on the status information, whether the memory MEM of the image sensor device 1200 is available. If it is determined that the memory MEM of the image sensor device 1200 is available, the electronic device 1000 may perform operation S130. Otherwise, if it is determined that the memory MEM of the image sensor device 1200 is unavailable, the electronic device 1000 may perform operation S140.

At operation S130, the neural network computing device 1100 may store data in the memory MEM of the image sensor device 1200. The neural network computing device 1100 may transmit a write command and data related to the neural network model to the image sensor device 1200. The image sensor device 1200 may receive the write command and the data. The image sensor device 1200 may store the data in the memory MEM in response to or based on the write command in the second mode.

At operation S140, the neural network computing device 1100 may store the data in the memory 1130. If the memory MEM of the image sensor device 1200 is unavailable for the neural network computing device 1100, the neural network computing device 1100 may perform a neural network computing operation using the memory 1130.

At operation S150, the neural network computing device 1100 may perform a computing operation corresponding to the neural network model. At operation S160, the neural network computing device 1100 may determine whether the current layer among the plurality of layers of the neural network model is the last layer. If the current layer is the last layer, the neural network computing device 1100 may proceed to operation S170, and otherwise may return to operation S110.

At operation S170, the neural network computing device 1100 may output a result. The neural network computing device 1100 may output, as the result, output data output from the last layer of the neural network model.

Figure 8:
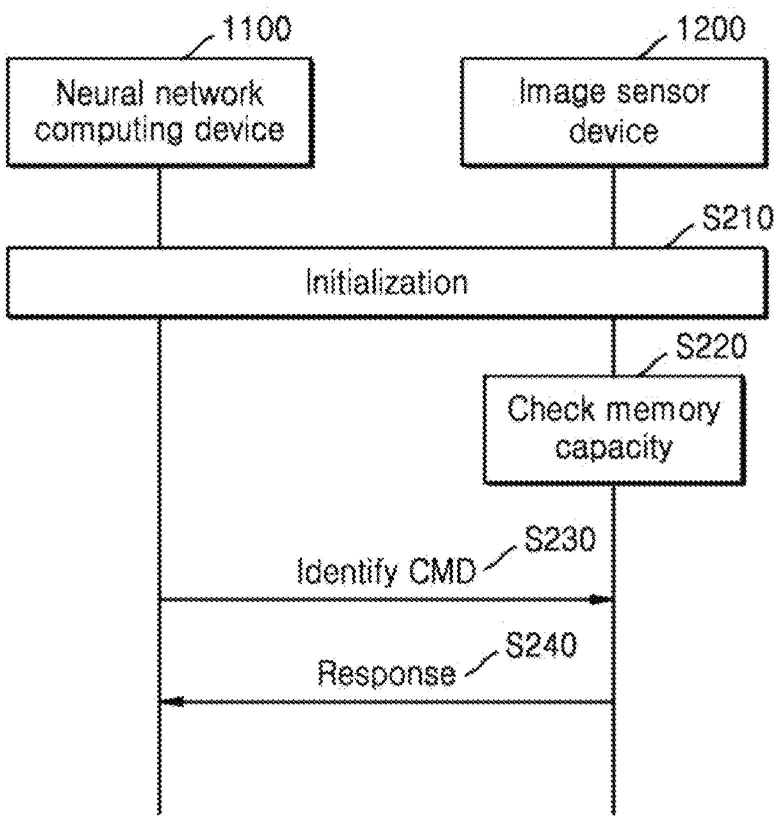
FIG. 8 is a signaling diagram illustrating an operating method of the electronic device of FIG. 1, according to an embodiment.

FIG. 8 is a signaling diagram illustrating an operating method of the electronic device 1000 of FIG. 1.

FIG. 8 is a signaling diagram illustrating an initialization operation or a power-up operation of the electronic device 1000. Referring to FIGS. 1 and 8, at operation S210, the electronic device 1000 may be powered up, powered on, initialized, or otherwise activated. When the electronic device 1000 is powered up, the neural network computing device 1100 may transmit information indicating that the power-up operation or initialization operation has started or is being performed to the image sensor device 1200. In embodiments, the information indicating that the power-up operation or initialization operation has been started or is being performed by the electronic device 1000 may be referred to as power-up information. In response to or based on receiving the power-up information, the image sensor device 1200 may perform an initialization operation.

At operation S220, the image sensor device 1200 may check a memory capacity. For example, the image sensor device 1200 may check or determine the capacity of the memory MEM in response to or based on the power-up information discussed above with reference to operation S210. The image sensor device 1200 may identify the capacity of the memory MEM to be lent to the neural network computing device 1100. For example, the image sensor device 1200*a* may identify the capacity of the buffer memory 1271. The image sensor device 1200*b* may identify the capacity of the memory circuit MCT of each of the plurality of digital pixels DP. The image sensor device 1200*b* may identify the capacity of the buffer memory 1235*b*. The image sensor device 1200*b* may calculate the total capacity of the memory MEM by performing an addition operation on the capacity of the memory circuits MCT of the plurality of digital pixels DP and the capacity of the buffer memory 1235*b*.

The neural network computing device 1100 may recognize information about the image sensor device 1200 using an identify command (or a device information request command). At operation S230, the neural network computing device 1100 may transmit, to the image sensor device 1200, an identify command for obtaining device information about the image sensor device 1200. At operation S240, the image sensor device 1200 may output an identify response (or for example a device information response) in response to or based on the received identify command. The identify response may include information regarding the capacity of the memory MEM.

The neural network computing device 1100 may identify the device information about the image sensor device 1200 in response to or based on the identify response (or the device information response). In an embodiment, the device information response may include at least one of information about the device type of the image sensor device 1200, the capacity of the memory MEM, and the like. As described above, the neural network computing device 1100 may identify information about the capacity of the memory MEM of the image sensor device 1200 and the like through the identify command.

As described above, the image sensor device 1200 may check a memory capacity in response to or based on power-up information. The image sensor device 1200 may output the identify response including information about the memory capacity in response to or based on the identify command received from the neural network computing device 1100. The neural network computing device 1100 may identify the capacity of the memory MEM of the image sensor device 1200 based on the identify response.

Figure 9:
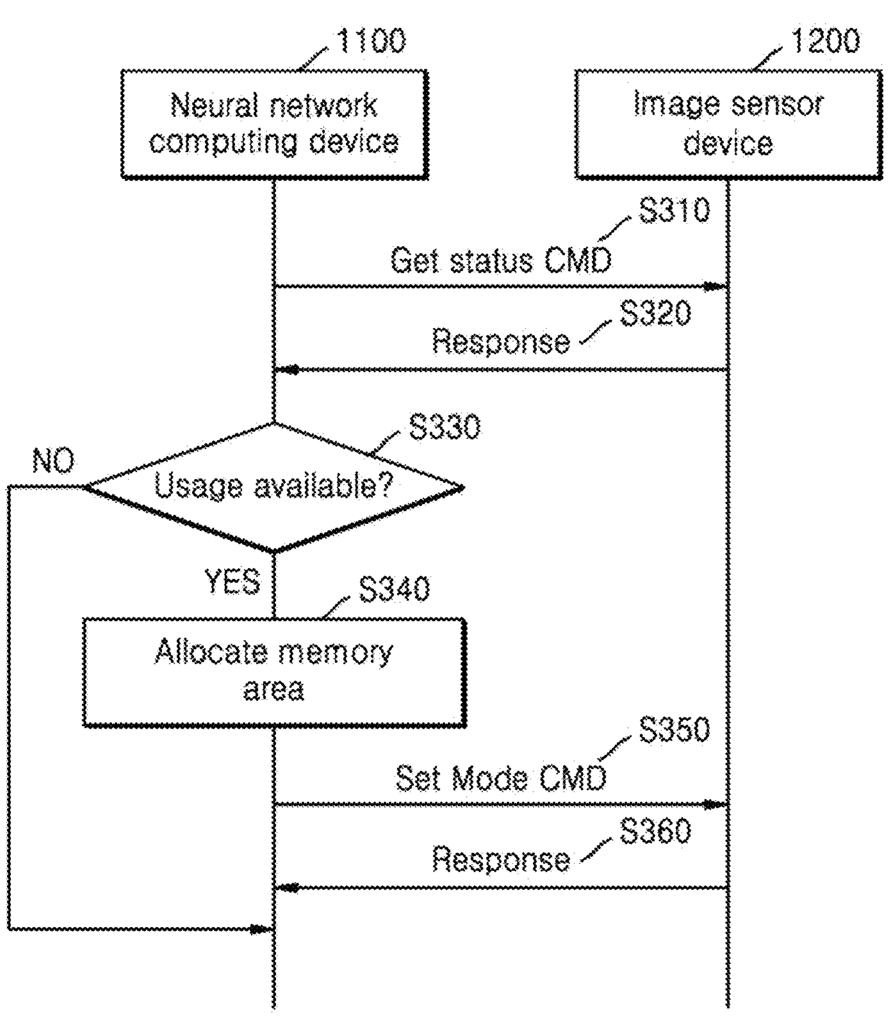
FIG. 9 is a signaling diagram illustrating an operating method of the electronic device of FIG. 1, according to an embodiment.

FIG. 9 is a signaling diagram illustrating an operating method of the electronic device 1000 of FIG. 1.

A mode setting method of the image sensor device 1200 is described with reference to FIG. 9. Referring to FIGS. 1 and 9, at operation S310, the neural network computing device 1100 may transmit a get status command to the image sensor device 1200. The get status command may be used to check whether the memory MEM of the image sensor device 1200 is available for the neural network computing device 1100.

At operation S320, the image sensor device 1200 may transmit a response including status information to the neural network computing device 1100. The status information may indicate the status of the memory MEM of the image sensor device 1200. For example, a first status may indicate that the memory MEM of the image sensor device 1200 is available for the neural network computing device 1100. A second status may indicate that the memory MEM of the image sensor device 1200 is unavailable for the neural network computing device 1100. For example the image sensor device 1200 may output a response including the status information indicating the first status or the second status to the neural network computing device 1100 in response to or based on the get status command received from the neural network computing device 1100.

For example, the first status may indicate that the original function of the image sensor device 1200 (e.g., an image sensing operation) is not being performed. The second status may indicate that the original function of the image sensor device 1200 (e.g., an image sensing operation) is being performed. For example the first status may indicate that it is possible to lend the memory MEM to the neural network computing device 1100 because the image sensor device 1200 is not performing an operation of converting an optical signal into image data. The second status may indicate that it is impossible to lend the memory MEM to the neural network computing device 1100 because the image sensor device 1200 is performing an operation of converting an optical signal into image data.

At operation S330, the neural network computing device 1100 may determine whether the memory MEM of the image sensor device 1200 is available. In an embodiment, the neural network computing device 1100 may determine whether the memory MEM is available, based on the received status information. For example, the neural network computing device 1100 may determine that the memory MEM is available when the status information indicates the first status. The neural network computing device 1100 may determine that the memory MEM is unavailable when the status information indicates the second status. If it is determined that the memory MEM is available, the neural network computing device 1100 may perform operation S340. If it is determined that the memory MEM is unavailable, the neural network computing device 1100 may not perform subsequent operations of allocating the memory MEM of the image sensor device 1200 and setting a mode.

At operation S340, the neural network computing device 1100 may allocate at least a partial area or portion of the memory MEM of the image sensor device 1200 as an exclusive area for the neural network computing device 1100. At operation S350, the neural network computing device 1100 may transmit a set mode command to the image sensor device 1200. The set mode command may be a command for changing the mode of the image sensor device 1200. The neural network computing device 1100 may change the mode of the image sensor device 1200 from the first mode to the second mode. The neural network computing device 1100 may transmit the set mode command including mode information indicating the second mode to the image sensor device 1200 based on the status information received from the image sensor device 1200.

The image sensor device 1200 may change the mode thereof in response to or based on the set mode command. The image sensor device 1200 may change the mode thereof from the first mode to the second mode. The image sensor device 1200 may allow the neural network computing device 1100 to use the memory MEM. In the second mode, the image sensor device 1200 may not use the memory MEM for image data generation. In the second mode, the image sensor device 1200 may store data in the memory MEM under control of the neural network computing device 1100. For example, in the second mode, the image sensor device 1200 may not provide power to a module or circuit not associated with the memory MEM.

At operation S360, the image sensor device 1200 may transmit a response to the neural network computing device 1100. The image sensor device 1200 may output a response to the set mode command to the neural network computing device 1100. The image sensor device 1200 may transmit a response to the neural network computing device 1100 to inform that mode change has been completed.

As described above, the neural network computing device 1100 may determine whether the memory MEM of the image sensor device 1200 is available, using a get status command. The neural network computing device 1100 may allocate the memory MEM of the image sensor device 1200 as an exclusive area for the neural network computing device 1100 based on the status of the image sensor device 1200. The neural network computing device 1100 may transmit a set mode command to the image sensor device 1200. The image sensor device 1200 may change the mode thereof in response to or based on a set mode command from the neural network computing device 1100.

Figure 10:
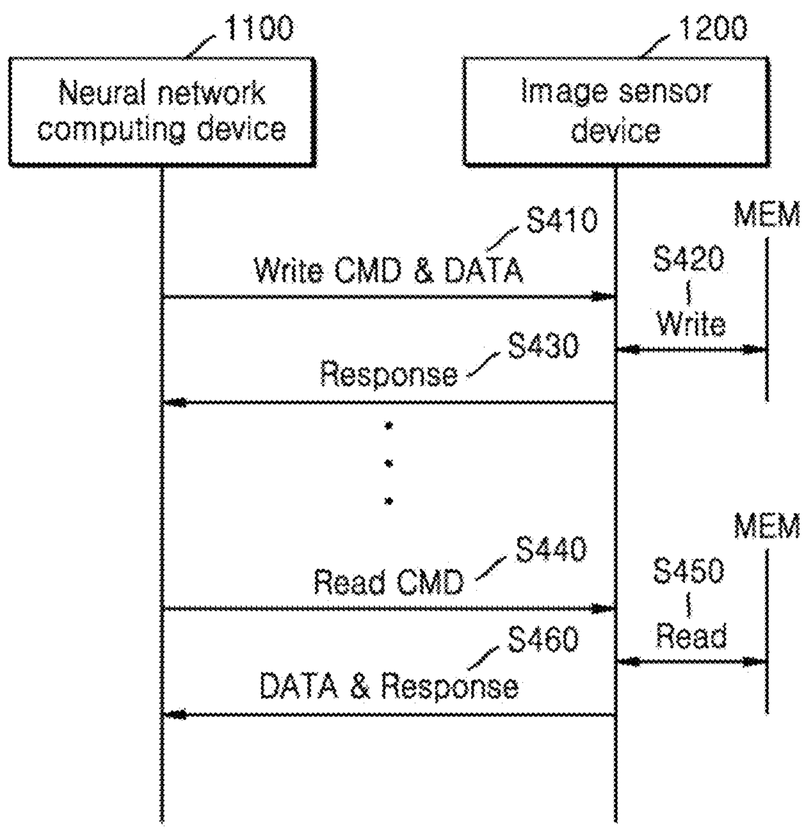
FIG. 10 is a signaling diagram illustrating an operating method of the electronic device of FIG. 1, according to an embodiment.

FIG. 10 is a signaling diagram illustrating an operating method of the electronic device 1000 of FIG. 1.

An operating method of the image sensor device 1200 in the second mode is described with reference to FIG. 10. Referring to FIGS. 1 and 10, the neural network computing device 1100 may perform a write operation or a read operation on the memory MEM of the image sensor device 1200. An access of the neural network computing device 1100 to the memory MEM of the image sensor device 1200 may be performed after performing the mode setting operation of FIG. 9 (e.g., after changing the mode of the image sensor device 1200 to the second mode).

At operation S410, the neural network computing device 1100 may transmit a write command and data to the image sensor device 1200. The image sensor device 1200 may receive the write command and the data. At operation S420, the image sensor device 1200 may store the data in the memory MEM in response to or based on the write command. At operation S430, the image sensor device 1200 may transmit a write response to the neural network computing device 1100.

At operation S440, the neural network computing device 1100 may transmit a read command to the image sensor device 1200. The image sensor device 1200 may receive the read command. At operation S450, the image sensor device 1200 may read data corresponding to the read command from the memory MEM in response to or based on the read command. At operation S460, the image sensor device 1200 may transmit the data and a read response to the neural network computing device 1100.

As described above, the image sensor device 1200 may store or provide data under control of the neural network computing device 1100 in the second mode. The image sensor device 1200 may store data of the neural network computing device 1100 in the memory MEM. In the second mode, the image sensor device 1200 may function as a memory of the neural network computing device 1100.

Figure 11:
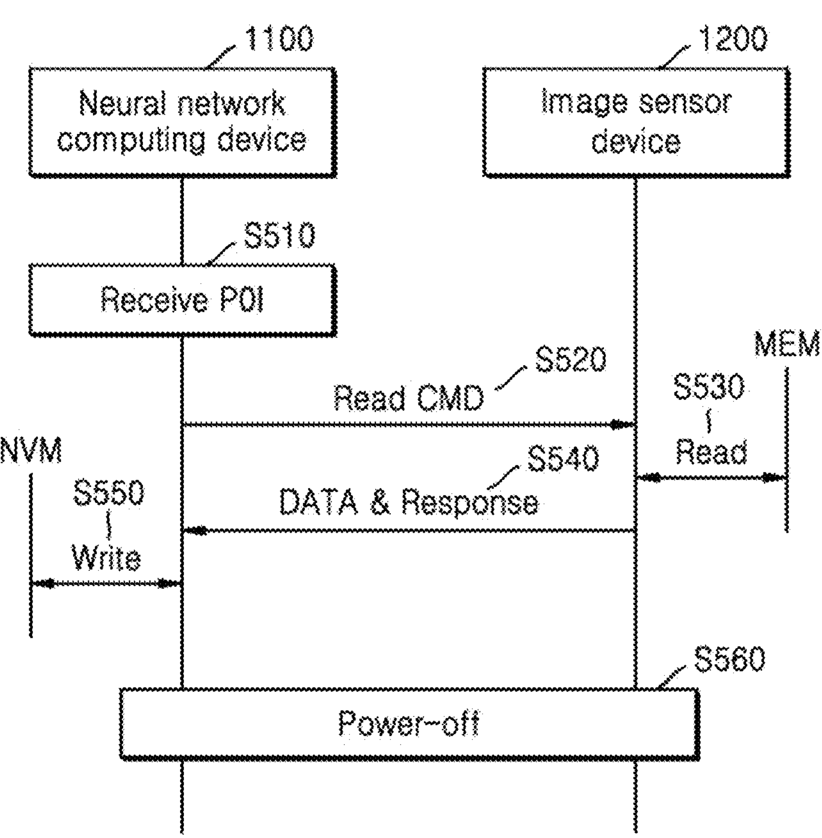
FIG. 11 is a signaling diagram illustrating an operating method of the electronic device of FIG. 1, according to an embodiment.

FIG. 11 is a signaling diagram illustrating an operating method of the electronic device 1000 of FIG. 1.

A power-off operation (or for example reset operation) of the electronic device 1000 is described with reference to FIG. 11. The neural network computing device 1100 may transmit a read command to the image sensor device 1200 in response to or based on power-off information received from the outside. In embodiments, the power-off information may indicate that at least one of the electronic device 1000, the neural network computing device 1100, and the image sensor device 1200 is being or will be powered off, powered down, or otherwise deactivated. The image sensor device 1200 may transmit data read from the memory MEM to the neural network computing device 1100 in response to or based on the read command. The neural network computing device 1100 may store the data received from the image sensor device 1200 in an NVM and then be turned off.

Referring to FIGS. 1 and 11, at operation S510, the neural network computing device 1100 may receive power-off information (POI). For example, the neural network computing device 1100 may receive, recognize, or sense information about a power-off event or a deactivation event which is occurring or will occur regarding at least one of the electronic device 1000, the neural network computing device 1100, and the image sensor device 1200. When the image sensor device 1200 is set to the second mode, the electronic device 1000 may perform the operations below. In some embodiments, when neural network model-related data is stored in the memory MEM of the image sensor device 1200, the electronic device 1000 may perform the operations below.

At operation S520, the neural network computing device 1100 may transmit a read command to the image sensor device 1200 in response to or based on the POI. The neural network computing device 1100 may transmit the read command to the image sensor device 1200 to read the neural network model-related data stored in the image sensor device 1200. The image sensor device 1200 may receive the read command.

At operation S530, the image sensor device 1200 may read data from the memory MEM in response to or based on the read command. At operation S540, the image sensor device 1200 may transmit the data and a read response to the neural network computing device 1100. At operation S550, the neural network computing device 1100 may store the received data in an NVM. For example, the neural network computing device 1100 may store, in a storage device including the NVM, the data loaded from the memory MEM of the image sensor device 1200. Thereafter, at operation S560, the neural network computing device 1100 and the image sensor device 1200 may be turned off. For example, power provided to the neural network computing device 1100 and the image sensor device 1200 may be cut off.

As described above, before the electronic device 1000 is turned off, the electronic device 1000 may store, in the NVM, data stored in the image sensor device 1200. To prevent a data loss, the electronic device 1000 may read the data stored in the image sensor device 1200 and write the read data in the storage device or the like.

Figure 12:
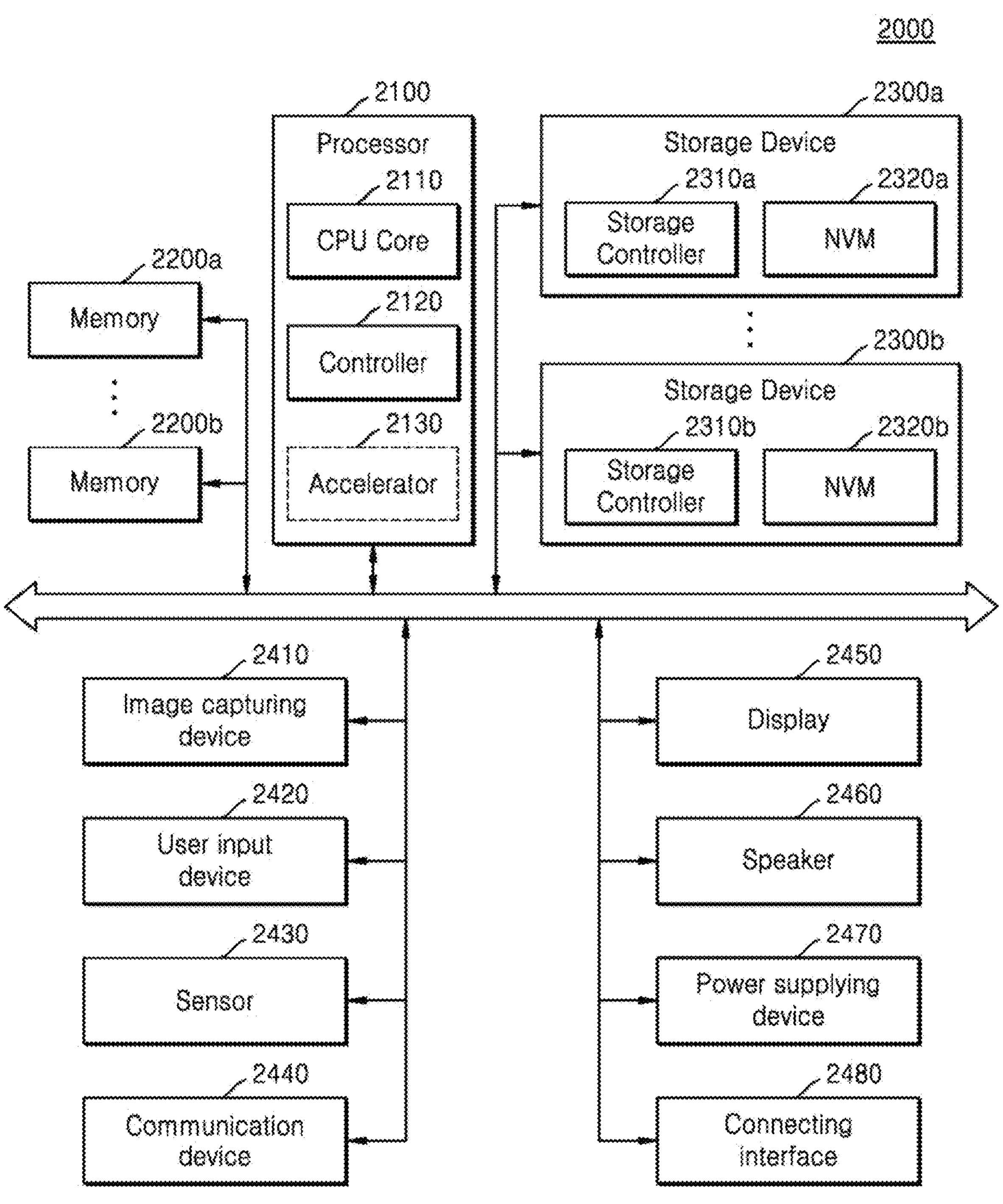
FIG. 12 is a block diagram illustrating a system to which an image sensor device is applied, according to an embodiment.

FIG. 12 is a block diagram illustrating a system 2000 to which an image sensor device according to an embodiment is applied.

The system 2000 of FIG. 12 may be basically a mobile system, such as a mobile phone, a smartphone, a tablet PC, a wearable device, a healthcare device, or an IoT device. However, the system 2000 of FIG. 12 is not limited to the mobile system and may be at least one of a PC, a laptop computer, a server, a media player, an automotive device, such as a navigation system, and the like.

Referring to FIG. 12, the system 2000 may include a main processor 2100, memories 2200*a* and 2200*b*, and storage devices 2300*a* and 2300*b* and further include one or more of an image capturing device 2410, a user input device 2420, a sensor 2430, a communication device 2440, a display 2450, a speaker 2460, a power supplying device 2470, and a connecting interface 2480.

The main processor 2100 may control a general operation of the system 2000, and more particularly, control an operation of the other components constituting the system 2000. The main processor 2100 may be implemented by at least one of a general-use processor, an exclusive processor, an AP, and the like.

The main processor 2100 may include one or more CPU cores 2110 and further include a controller 2120 configured to control the memories 2200*a* and 2200*b* and/or the storage devices 2300*a* and 2300*b*. According to embodiments, the main processor 2100 may further include an accelerator 2130 that is an exclusive circuit for high-speed data computations, such as an AI data computation. The accelerator 2130 may include at least one of a graphics processing unit (GPU), a neural processing unit (NPU), a data processing unit (DPU), and the like, and may be implemented by a separate chip physically independent to the other components of the main processor 2100.

In an embodiment, the main processor 2100 may access a memory of the image capturing device 2410. For example, the accelerator 2130 may store data related to an AI data computation in the memory of the image capturing device 2410. The accelerator 2130 may perform the AI data computation by using the data stored in the memory of the image capturing device 2410.

In an embodiment, the main processor 2100 may access a memory of the sensor 2430. For example, the accelerator 2130 may store data related to an AI data computation in the memory of the sensor 2430. The accelerator 2130 may perform the AI data computation by using the data stored in the memory of the sensor 2430.

The memories 2200*a* and 2200*b* may be used as a main memory device of the system 2000 and may include a volatile memory, such as SRAM and/or DRAM, or an NVM, such as PRAM and/or RRAM. The memories 2200*a* and 2200*b* may be implemented in the same package as the main processor 2100.

The storage devices 2300*a* and 2300*b* may function as a nonvolatile storage device storing data regardless of whether power is supplied thereto and may have a relatively larger storage capacity than the memories 2200*a* and 2200*b*. The storage devices 2300*a* and 2300*b* may include storage controllers 2310*a* and 2310*b* and NVMs 2320*a* and 2320*b* storing data under control of the controllers 2310*a* and 2310*b*, respectively. The NVMs 2320*a* and 2320*b* may include two-dimensional (2D) or three-dimensional (3D) vertical NAND (V-NAND) flash memory or other types of NVMs, such as PRAM and/or RRAM.

The storage devices 2300*a* and 2300*b* may be included in the system 2000 by being physically separated from the main processor 2100 or implemented in the same package as the main processor 2100. In some embodiments, the storage devices 2300*a* and 2300*b* may have a shape, such as a solid state device (SSD) or a memory card, to be detachably coupled to other components of the system 2000 using an interface, such as the connecting interface 2480 to be described below. The storage devices 2300*a* and 2300*b* may be devices to which a standard protocol, such as universal flash storage (UFS), embedded multi-media card (eMMC), or non-volatile memory express (NVMe), is applied but are not necessarily limited thereto.

The image capturing device 2410 may capture at least one of a still image and a video, and may include at least one of a camera, a camcorder, a webcam, and the like. The image capturing device 2410 may be or may correspond to at least one of the image sensor devices 1200, 1200*a*, and 1200*b* described with reference to FIGS. 1 to 11 or operate based on at least one of the methods described with reference to FIGS. 1 to 11. The image capturing device 2410 may provide an internal memory to the accelerator 2130.

The user input device 2420 may receive various types of data input from a user of the system 2000 and include at least one of a touch pad, a keypad, a keyboard, a mouse, a microphone, and the like.

The sensor 2430 may sense various types of physical amounts acquirable from the outside and convert the sensed physical amounts into electrical signals. The sensor 2430 may include at least one of a temperature sensor, a pressure sensor, an illuminance sensor, a position sensor, an acceleration sensor, a biosensor, a gyroscope sensor, and the like. Although the embodiments described above have been described based on an image sensor device (or an image capturing device) included in an electronic device, embodiments are not limited thereto. For example, an internal memory of the sensor 2430 included in an electronic device may store neural network model-related data to be executed by the accelerator 2130 (or a neural processor). For example when the sensor 2430 does not perform an original function, the sensor 2430 may provide a memory resource to the accelerator 2130. The sensor 2430 may change from the first mode to the second mode in the same manner as or similarly to the image sensor device 1200. In the second mode, the sensor 2430 may allow the accelerator 2130 or the main processor 2100 to access the internal memory of the sensor 2430. In the second mode, the sensor 2430 may operate as a memory of the accelerator 2130 or the main processor 2100.

The communication device 2440 may transmit and receive signals to and from other devices outside the system 2000 according to various communication protocols. The communication device 2440 may include at least one of an antenna, a transceiver, a modulator/demodulator (MODEM), and the like.

The display 2450 and the speaker 2460 may function as output devices configured to output visual information and auditory information to the user of the system 2000, respectively.

The power supplying device 2470 may appropriately transform power supplied from a battery embedded in the system 2000 and/or an external power source and supply the transformed power to each component in the system 2000.

The connecting interface 2480 may provide a connection between the system 2000 and an external device connected to the system 2000 to exchange data with the system 2000. The connecting interface 2480 may be implemented by various interface schemes, such as an advanced technology attachment (ATA) interface, a serial ATA (SATA) interface, an external SATA (e-SATA) interface, a small computer small interface (SCSI), a serial attached SCSI (SAS), a peripheral component interconnection (PCI) interface, a PCI express (PCIe) interface, an NVMe interface, an Institute of Electrical and Electronics Engineers (IEEE) 1394 interface, a universal serial bus (USB) interface, a secure digital (SD) card interface, a multi-media card (MMC) interface, an eMMC interface, a UFS interface, an embedded UFS (eUFS) interface, and a compact flash (CF) card interface.

FIG. 13 is a block diagram illustrating an electronic device 3000 to which an image sensor device according to an embodiment is applied.

Referring to FIG. 13, the electronic device 3000 may include a main processor 3100, a touch panel 3200, a touch driving circuit 3202, a display panel 3300, a display driving circuit 3302, a system memory 3400, a storage device 3500, an image processor 3600, a communication block 3700, an audio processor 3800, and a neural processor 3900. In an embodiment, the electronic device 3000 may be one of various electronic devices, such as a mobile communication terminal, a personal digital assistant (PDA), a portable media player (PMP), a digital camera, a smartphone, a tablet PC, a laptop computer, and a wearable device.

The touch driving circuit 3202 may control the touch panel 3200. The touch panel 3200 may sense a touch input from a user under control of the touch driving circuit 3202. The display driving circuit 3302 may control the display panel 3300. The display panel 3300 may display image information under control of the display driving circuit 3302.

The system memory 3400 may store data to be used for an operation of the electronic device 3000. For example, the system memory 3400 may temporarily store data processed or to be processed by the main processor 3100. For example, the system memory 3400 may include a volatile memory, such as SRAM, DRAM, or synchronous DRAM (SDRAM), and/or an NVM, such as PRAM, MRAM, ReRAM, or FRAM. In an embodiment, output data output from an ISP 3630 may be stored in the system memory 3400.

the storage device 3500 may store data regardless of power supply. For example, the storage device 3500 may include at least one of various NVMs, such as flash memory, PRAM, MRAM, ReRAM, and FRAM. For example, the storage device 3500 may include an embedded memory of the electronic device 3000 and/or a detachable memory.

The image processor 3600 may receive light through a lens 3610. An image sensor device 3620 and the ISP 3630 included in the image processor 3600 may generate image information regarding an external object based on the received light. In an embodiment, the image sensor device 3620 may be or may correspond to at least one of the image sensor devices 1200, 1200*a*, and 1200*b* described with reference to FIGS. 1 to 12 or operate based on at least one of the methods described with reference to FIGS. 1 to 12. The image sensor device 3620 may provide an internal memory thereof to the neural processor 3900.

The communication block 3700 may exchange signals with an external device/system using an antenna 3710. A transceiver 3720 and a MODEM 3730 of the communication block 3700 may process signals exchanged with an external device/system according to at least one of various communication protocols, such as long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The audio processor 3800 may process an audio signal by using an audio signal processor 3810. The audio processor 3800 may receive an audio input using a microphone 3820 or provide an audio output using a speaker 3830.

The main processor 3100 may control a general operation of the electronic device 3000. The main processor 3100 may control/manage operations of components of the electronic device 3000. The main processor 3100 may process various computations to operate the electronic device 3000. The main processor 3100 may execute one or more instructions of a program or a plurality of neural network models stored in a memory. The main processor 3100 according to an embodiment may be a central processing unit (CPU) but embodiments are not limited thereto, and in some embodiments the main processor 3100 may include at least one of an AP, a graphics processing unit (GPU), and the like.

The neural processor 3900 may indicate at least one of an AI-dedicated processor and the like designed as a hardware structure specialized to process a neural network model. The neural processor 3900 may generate a neural network model, train the neural network model, or perform a computation and generate output data by using the neural network model based on received input data. The neural network model may include various types of neural network models, such as a CNN, a DNN, an RNN, an RBM, a DBN, a bidirectional recurrent deep neural network (BRDNN), and a deep Q-network, but embodiments are not limited thereto. The neural network model may be downloaded from the outside to the electronic device 3000 and stored in the system memory 3400 of the electronic device 3000. In addition, the neural network model stored in the system memory 3400 may be updated.

In an embodiment, the neural processor 3900 may access the memory of the image sensor device 3620. The neural processor 3900 may write neural network model-related data in the memory of the image sensor device 3620. The neural processor 3900 may read the neural network model-related data from the image sensor device 3620.

In an embodiment, some of the components of FIG. 13 may be implemented in the form of a system-on-chip and provided as an AP of the electronic device 3000.

The function blocks used in the detailed description or the drawings may be implemented by software, hardware, or a combination thereof, the software may be machine code, firmware, embedded code, and application software, and the hardware may be a circuit, a processor, a computer, an integrated circuit, integrated circuit cores, a pressure sensor, an inertia sensor, a microelectromechanical system (MEMS), passive devices, or a combination thereof.

While some embodiments have been particularly shown and described herein, it will be understood that various changes in form and details may be made therein without departing from the scope of the following claims.

What is claimed is:

1. An electronic device comprising:
- a neural network computing device configured to perform a computing operation corresponding to a neural network model; and
- an image sensor device comprising:
  - a pixel array configured to receive optical signals and convert the received optical signals into electrical signals; and
  - a memory,
- wherein based on a mode of the image sensor device being a first mode, the memory is configured to store a pixel value, and
- wherein based on the mode of the image sensor device being a second mode, the memory is further configured to store neural network model-related data.

2. The electronic device of claim 1, wherein the image sensor device further comprises:
- a readout circuit configured to convert the electrical signals into image data and to output the image data; and
- a timing controller configured to control at least one of an operation and a timing of the image sensor device.

3. The electronic device of claim 2, wherein the readout circuit comprises:
- an analog-to-digital conversion circuit configured to convert a pixel signal received from the pixel array into a digital signal comprising the pixel value; and
- a buffer memory configured to store the pixel value.

4. The electronic device of claim 2, wherein the timing controller comprises:
- a mode control circuit configured to set the mode of the image sensor device based on a set mode command being received from the neural network computing device; and
- an interface circuit configured to communicate with the neural network computing device.

5. The electronic device of claim 1,
- wherein the pixel array comprises a plurality of digital pixels,
- wherein each digital pixel of the plurality of digital pixels comprises:
  - a photodetector;
  - an analog-to-digital converter; and
  - a memory circuit, and
- wherein the memory included in the image sensor device comprises the memory circuit included in the each digital pixel.

6. The electronic device of claim 5, wherein the image sensor device further comprises:
- a pixel driver configured to control the plurality of digital pixels; and
- a digital logic circuit configured to:
  - perform a digital signal processing operation on digital signals output from the plurality of digital pixels, and
  - output image data.

7. The electronic device of claim 6, wherein the digital logic circuit comprises:
- a sensor controller comprising a mode control circuit configured to set the mode of the image sensor device based on a set mode command being received from the neural network computing device, wherein the sensor controller is configured to control an operation of the image sensor device; and
- a data output circuit comprising an interface circuit configured to communicate with the neural network computing device, and a buffer memory configured to temporarily store at least one from among a digital signal and image data.

8. The electronic device of claim 6, wherein the image sensor device is configured to:
- check a memory capacity based on information indicating an initialization of the electronic device, and
- output information about the memory capacity based on an identify command being received from the neural network computing device.

9. The electronic device of claim 6, wherein the image sensor device is configured to output to the neural network computing device a response including status information indicating a first status or a second status based on a get status command being received from the neural network computing device, wherein the first status indicates that the memory is available for the neural network computing device, and wherein the second status indicates that the memory is unavailable for the neural network computing device.

10. The electronic device of claim 9, wherein the neural network computing device is further configured to transmit a set mode command comprising mode information indicating the second mode to the image sensor device based on the status information received from the image sensor device, and wherein the image sensor device is further configured to change the mode of the image sensor device from the first mode to the second mode based on the set mode command.

11. The electronic device of claim 1, wherein the neural network computing device is further configured to transmit a write command and data to the image sensor device, and wherein the image sensor device is configured to store the data in the memory based on the write command.

12. The electronic device of claim 1, wherein the neural network computing device is further configured to transmit a read command to the image sensor device, and wherein the image sensor device is configured to transmit data read from the memory to the neural network computing device based on the read command.

13. The electronic device of claim 1, wherein the neural network computing device is further configured to transmit a read command to the image sensor device based on information indicating a deactivation of the electronic device being received from an outside of the neural network computing device, and wherein the image sensor device is configured to transmit data read from the memory to the neural network computing device based on the read command.

14. The electronic device of claim 13, wherein the neural network computing device is further configured to store the data in a nonvolatile memory before the neural network computing device is powered off.

15. An electronic device comprising:

a neural network computing device configured to perform a computing operation corresponding to a neural network model; and an image sensor device, wherein the image sensor device comprises:

a pixel array comprising a plurality of digital pixels; and a buffer memory configured to temporarily store at least one from among a digital signal and image data corresponding to a signal output from the pixel array, wherein each digital pixel from among the plurality of digital pixels comprises:

a photodetector, an analog-to-digital converter, and a memory circuit, wherein a memory of the image sensor device comprises the buffer memory and the memory circuit included in the each digital pixel, wherein based on a mode of the image sensor device being a first mode, the image sensor device is configured to store a pixel value in the memory, and wherein based on the mode of the image sensor device being a second mode, the image sensor device is further configured to store neural network model-related data in the memory.

16. The electronic device of claim 15, wherein the image sensor device further comprises:

an interface circuit configured to communicate with the neural network computing device; and a mode control circuit configured to set the mode of the image sensor device based on a set mode command being received from the neural network computing device.

17. The electronic device of claim 15, wherein the neural network computing device is further configured to transmit a write command and data to the image sensor device, and wherein the image sensor device is further configured to store the data in the memory based on the write command.

18. The electronic device of claim 15, wherein the neural network computing device is further configured to transmit a read command to the image sensor device, and wherein the image sensor device is further configured to transmit data read from the memory to the neural network computing device based on the read command.

19. An electronic device comprising:

a neural network computing device configured to perform a computing operation corresponding to a neural network model; and an image sensor device, comprising:

a pixel array configured to receive optical signals and to convert the received optical signals into electrical signals; and a readout circuit configured to convert the electrical signals into image data and output the image data, wherein the readout circuit comprises:

an analog-to-digital conversion circuit configured to convert a pixel signal received from the pixel array into a digital signal comprising a pixel value; and a buffer memory configured to store the pixel value, and wherein based on a mode of the image sensor device being a first mode, the image sensor device is configured to store the pixel value in the buffer memory, and wherein based on the mode of the image sensor device being a second mode, the image sensor device is further configured to store neural network model-related data in the buffer memory.

20. The electronic device of claim 19, wherein the neural network model-related data comprises at least one from among a parameter, input data, intermediate data, output data, training data, and verification data.

* * * * *